(12) United States Patent
Sharma et al.

(10) Patent No.: US 12,153,810 B2
(45) Date of Patent: Nov. 26, 2024

(54) STORAGE DEVICE POOL MANAGEMENT BASED ON STORAGE DEVICE LOGICAL TO PHYSICAL (L2P) TABLE INFORMATION

(71) Applicant: Western Digital Technologies, Inc., San Jose, CA (US)

(72) Inventors: Amit Sharma, Bangalore (IN); Dinesh Kumar Agarwal, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 39 days.

(21) Appl. No.: 17/850,873

(22) Filed: Jun. 27, 2022

(65) Prior Publication Data
US 2023/0418482 A1 Dec. 28, 2023

(51) Int. Cl.
G06F 3/06 (2006.01)

(52) U.S. Cl.
CPC .......... *G06F 3/0629* (2013.01); *G06F 3/0626* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 7,886,115 B2 | 2/2011 | Sanvido et al. | |
| 8,032,689 B2 | 10/2011 | Kulkarni | |
| 8,725,934 B2 | 5/2014 | Batwara et al. | |
| 8,931,054 B2 | 1/2015 | Huynh et al. | |
| 8,966,191 B2 | 2/2015 | Flynn et al. | |
| 9,047,211 B2 | 6/2015 | Wood et al. | |
| 9,058,123 B2 | 6/2015 | Joshi et al. | |
| 9,122,579 B2 | 9/2015 | Flynn et al. | |
| 9,146,688 B2 | 9/2015 | Yang et al. | |
| 9,201,677 B2 | 12/2015 | Joshi et al. | |
| 9,251,086 B2 | 2/2016 | Peterson et al. | |
| 9,442,844 B2 | 9/2016 | Flynn et al. | |
| 9,697,130 B2 | 7/2017 | Karippara et al. | |
| 9,798,673 B2 | 10/2017 | Peterson et al. | |
| 9,864,529 B1 | 1/2018 | Chen et al. | |
| 10,013,354 B2 | 7/2018 | Flynn et al. | |
| 10,073,656 B2 | 9/2018 | Zhe Yang et al. | |
| 10,860,228 B1 * | 12/2020 | Mulani | G06F 3/0604 |
| 11,182,101 B2 | 11/2021 | Bazarsky et al. | |
| 11,775,174 B1 * | 10/2023 | Chatterjee | G06F 3/0685 711/102 |

(Continued)

*Primary Examiner* — Edward J Dudek, Jr.
*Assistant Examiner* — Ralph A Verderamo, III
(74) *Attorney, Agent, or Firm* — LOZA & LOZA, LLP; Gabriel Fitch

(57) ABSTRACT

Methods, systems, and apparatuses for storage device pool management based on storage device logical to physical (L2P) table information are provided. One such data storage system includes data storage devices each including a non-volatile memory; and a storage management device configured to receive L2P table information from at least two of the data storage devices; receive host data from a host device to be stored in one or more of the data storage devices; select, based on the L2P table information from the at plurality of data storage devices and the size of the host data, a target data storage device from the plurality of data storage devices; and send the host data to the target data storage device.

20 Claims, 16 Drawing Sheets

(56) References Cited

U.S. PATENT DOCUMENTS

| | | | |
|---|---|---|---|
| 2005/0138338 A1* | 6/2005 | Sodani | G06F 9/3838 |
| | | | 712/E9.046 |
| 2006/0282644 A1* | 12/2006 | Wong | G06F 12/1009 |
| | | | 711/E12.008 |
| 2010/0235473 A1* | 9/2010 | Koren | H04W 4/50 |
| | | | 709/219 |
| 2014/0007189 A1 | 1/2014 | Huynh et al. | |
| 2016/0062885 A1* | 3/2016 | Ryu | G06F 12/0253 |
| | | | 711/103 |
| 2016/0179386 A1* | 6/2016 | Zhang | G06F 3/0679 |
| | | | 711/103 |
| 2017/0192903 A1* | 7/2017 | Kawamura | G06F 12/0246 |
| 2020/0034234 A1* | 1/2020 | Wu | G06F 12/0246 |
| 2020/0042250 A1* | 2/2020 | Oh | G06F 3/0611 |
| 2020/0310669 A1* | 10/2020 | Bazarsky | G06F 3/0647 |
| 2022/0035747 A1* | 2/2022 | Bhardwaj | G06F 12/1009 |
| 2022/0188244 A1* | 6/2022 | Ambula | G06F 12/0246 |
| 2022/0253245 A1* | 8/2022 | Seo | G06F 3/0679 |
| 2023/0069122 A1* | 3/2023 | Jeon | G06F 12/1009 |

\* cited by examiner

STORAGE DEVICE POOL MANAGEMENT BASED ON STORAGE DEVICE LOGICAL TO PHYSICAL (L2P) TABLE INFORMATION

FIELD

The subject matter described herein relates to management of pools of data storage devices (DSDs). More particularly, the subject matter relates, in some examples, to storage device pool management based on storage device logical to physical (L2P) table information.

INTRODUCTION

DSDs, such as solid-state devices (SSDs), can be pooled into storage pools. This type of storage virtualization is used in various information technology (IT) infrastructures. In principle, a storage pool includes multiple storage devices pooled together to form a virtual storage pool (VSP), eliminating the need to communicate with each storage device individually and collectively providing larger overall capacity. VSPs offer many advantages such as effective utilization of various storage medias and ease of access of storage media. At the same time, the various SSDs in a VSP may have different firmware and/or hardware architectures.

SSDs use L2P tables to maintain a mapping between logical memory addresses (e.g., the "logical" location used by a host computing device) to physical memory addresses (e.g., the "physical" location within the non-volatile memory (NVM) of the SSD). The use of L2P tables is necessary because data written to the NVM of an SSD (e.g., flash memory) is not necessarily stored in a logical block order.

SSDs are generally configured to store L2P tables, or some portion of the L2P tables, in random access memory (RAM) as it is typically substantially faster than the NVM. However, SSDs have different architectures. Some SSDs have sufficient RAM to cache all of their L2P table. Other SSDs only have sufficient RAM to load some portion of their L2P table. In such SSDs, the required L2P table entries are loaded from NVM on demand. This is less expensive because it requires less RAM, but is also less efficient because access to L2P entries stored in NVM is substantially slower than access to the L2P entries stored in RAM. Typically, these SSDs compress L2P entries for sequential logical block address (LBA) ranges. The degree of this compression again, depends on device architecture and/or configuration. As such, there is a need in the art for improved techniques for managing storage pools that takes into account the characteristics of the L2P tables of storage devices in the pool.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a DSD, including: a plurality of DSDs each comprising a NVM; a storage management device configured to: receive L2P table information from at least two of the plurality of DSDs; select, based on the L2P table information from the at least two of the plurality of DSDs, a target DSD from the plurality of DSDs; and send data to the target DSD.

Another aspect of the disclosure is a method for data storage, the method comprising: receiving L2P table information at a storage management device from at least two of a plurality of DSDs, the plurality of DSDs each comprising a NVM; selecting, based on the L2P table information, a target DSD from the plurality of DSDs; receiving data from a host device to be stored in one of the plurality of DSDs; and sending the data to the target DSD.

Another aspect of the disclosure provides a data storage system, comprising: a plurality of DSDs each comprising a NVM; means for receiving L2P table information at a storage management device from the plurality of DSDs, the plurality of DSDs each comprising a NVM; means for selecting, based on the L2P table information, a target DSD from the plurality of DSDs; means for receiving data from a host device to be stored in one of the plurality of DSDs; and means for sending the data to the target DSD.

DETAILED DESCRIPTION

Figure 1:
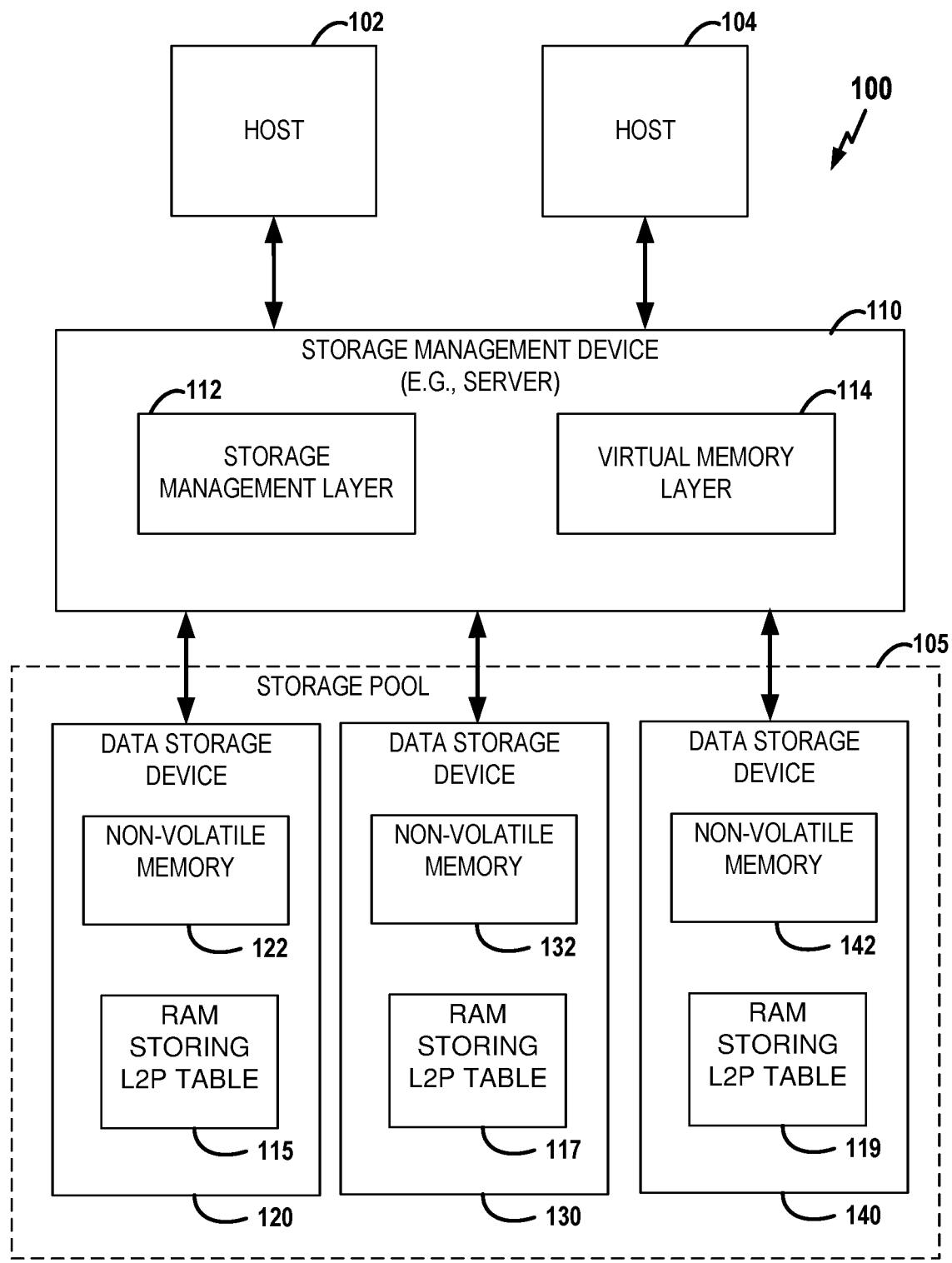
FIG. 1 is a schematic block diagram illustrating an exemplary data storage system embodied as a pool of DSDs and a storage management device configured to manage the pool of DSDs based on L2P table information from the DSDs in accordance with some aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to DSDs and to data storage controllers of the DSDs. In the examples described herein, data is stored within NVM arrays. In other examples, data may be stored in hard disk drives (HDD) using magnetic recording. DSDs with NVM arrays may be referred to as SSDs. Some SSDs use NAND flash memory, herein referred to as "NANDs." A NAND is a type of non-volatile storage technology that does not require power to retain data. It exploits negative-AND, i.e., NAND, logic. For the sake of brevity, an SSD having one or more NAND dies will be used as a non-limiting example of a DSD below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

Overview

Aspects of the disclosure relate to data storage pools and techniques to distribute host data among storage devices in the pool that take into account the collective characteristics of the corresponding L2P tables, and in some cases, minimize a number of L2P table entries generated in conjunction with storing the host data. One particular aspect involves a data storage system. In such an embodiment, the data storage system includes a plurality of DSDs each including a NVM and a storage management device. The storage management device can be configured to receive L2P table information from at least two of the DSDs; receive host data from a host device to be stored in the DSDs; select, based on the L2P table information, a target DSD from the DSDs; and send the host data to the target DSD.

In some aspects, the L2P table information includes a maximum sequential compression amount for a respective L2P table. In such aspects, the storage management device is configured to select, based on the maximum sequential compression amount and a size of the host data, the target DSD that will minimize a total number of new L2P table entries required to write the host data to the target DSD.

In another aspect, the L2P table information includes an available space within a RAM cache for a respective L2P table. In such aspects, the storage management device may be configured to select the target DSD having sufficient available space in the L2P RAM cache of the target DSD to store a number of L2P table entries required to write the host data to the target DSD. In an aspect, the storage management device may be configured to select the target DSD such that a total number of new L2P table entries required to store the host data in the target DSD is minimized.

Several advantages are provided by these improved techniques for L2P table management. For example, as multiple SSDs are pooled together to form a storage pool (or VSP), inefficiency from L2P table loading and/or L2P table entry generation can be reduced by accounting for capabilities of the SSDs in the storage pool. When the storage management device writes host data to DSDs in the storage pool, it can give preference to SSDs which generate fewer L2P entries by accounting for different compression capabilities in different storage media. In addition, SSDs may have different amounts of RAM allocated to L2P table storage. The storage management device can direct data accordingly, to ensure L2P RAM usage is consistent across the SSDs in the storage pool, and that host data is preferentially sent to SSDs in the storage pool with sufficient L2P RAM to store the host data.

Exemplary Devices, Systems and Procedures

FIG. 1 is a schematic block diagram illustrating an exemplary data storage system embodied as a pool of DSDs and a storage management device configured to manage the pool of DSDs based on L2P table information from the DSDs in accordance with some aspects of the disclosure. The data storage system 100 may be embodied as a storage management device 110 coupled to a plurality of DSDs 120, 130, and 140 forming a storage pool 105 (e.g., a VSP). The storage management device 110 is also coupled to two hosts, 102 and 104. The storage management device 110 can be a server, or another suitable computing device. The storage management device 110 can be configured to include a storage management layer 112 configured to manage the distribution of host data. Specifically, the storage management device 110 is configured to receive L2P table information from DSDs in the VSP 105, receive host data from a host device (e.g., host 102 or host 104) to be stored in one or more of the DSDs, select a target DSD from the VSP 105, and send the host data to the target DSD. The storage management device 110 further includes a virtual memory layer 114 configured to provide hosts 102 and 104 with an abstraction of DSDs 120, 130, and 140 embodied as a VSP, wherein the capacity of the VSP (i.e., "3X") is the sum of the respective capacities of DSDs 120, 130, and 140. It should be appreciated that figures provided herein may show specific exemplary capacities for DSDs 120, 130, and 140, but other suitable/relative capacities can be used in other embodiments.

As illustrated, the storage management device 110 is coupled to hosts 102 and 104. The hosts 102 and 104 provide access commands (e.g., read and write commands) and data (in the case of a write command) to the storage management device 110 for storage in the VSP that includes DSDs 120, 130, and 140. For example, the hosts 102 and 104 may provide a write command to the storage management device 110 for writing host data to the VSP, or a read command to the storage management device 110 for reading data from the VSP. The hosts 102 and 104 may be any system or device having a need for data storage or retrieval and a compatible interface for communicating with the VSP. For example, the hosts 102 and 104 may be a computing device, a personal computer, a portable computer, a workstation, a server, a personal digital assistant, a digital camera, or a digital phone as merely a few examples. In FIG. 1, two hosts are included data storage system 100. In another aspect, the system can include more than two hosts.

The DSDs 120, 130, and 140 can include one or more SSDs, and one or more other storage devices such as magnetic storage devices, tape drives, and the like. As illustrated, DSDs 120, 130, and 140 each respectively include NVM 122, 132, and 142 configured to persistently store host data. The DSDs can also include RAM including a portion of the RAM (L2P RAM cache) configured to store an L2P table 115, 117, and 119.

L2P Table Management

L2P tables are cached, either fully or partially in RAM, depending on the RAM availability in the DSD. For those that are partially cached, the remainder is stored in the NVM. However, most or all architectures compress sequentially written L2P entries. In such case, sequentially written LBAs' L2P entries in an L2P table are compressed to save RAM space. Storage architectures for DSDs may be configured to take advantage of different compression strategies to reduce the space an L2P entry requires. Some DSDs manage sequential LBA ranges, while others compress them when they are loaded into RAM. For example, some DSDs compress entries within a die page, others at a metapage level, while others compress entries for a logical group.

Figure 2:
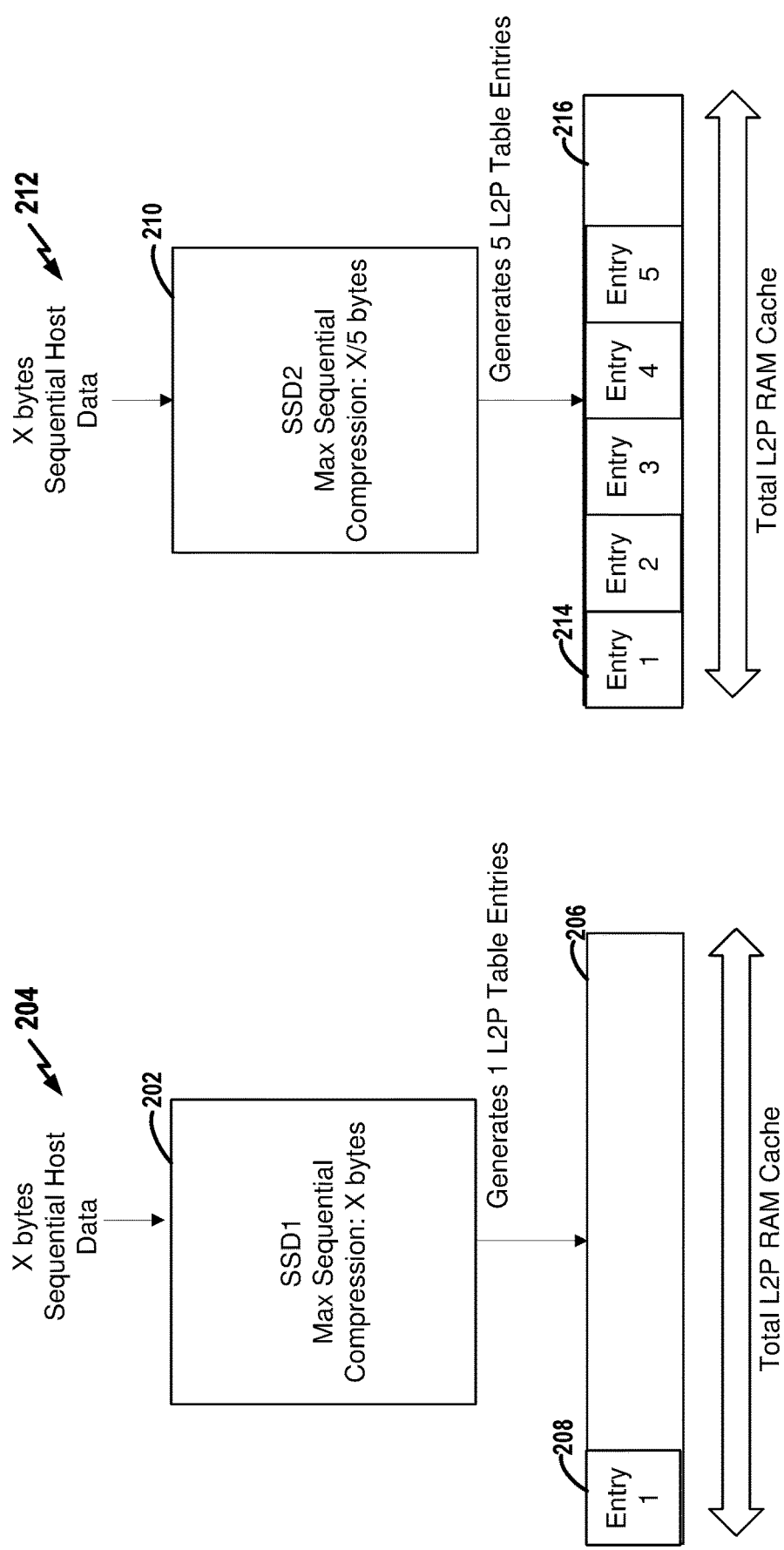
FIG. 2 is a schematic diagram illustrating the number of L2P table entries generated according to a respective maximum sequential data compression for two SSDs receiving the same amount of sequential host data in accordance with some aspects of the disclosure.

FIG. 2 is a schematic diagram illustrating that the number of L2P tables generated for a given SSD will depend on the maximum sequential compression of the SSD, in accordance with some aspects of the disclosure. In this example, SSD1 202 has a maximum sequential compression of X bytes. This is a function of its architecture and the associated compression strategy used by the SSD for L2P table storage in L2P RAM cache 206. In the event that a host provides SSD1 202 with X bytes of sequential host data 204 for a write command, SSD1 will generate 1 new L2P entry 208 in L2P RAM cache 206. For comparison, consider SSD2 210 which has a maximum sequential compression of X/5 bytes, again as a function of its architecture and associated compression strategy. In the event that a host provides SSD2 202 with X bytes of sequential host data 212, SSD2 will generate 5 new L2P table entries 214 in L2P RAM cache 216. Thus, given the same X bytes of host data, for an SSD with a maximum sequential L2P compression of X bytes, the compression will result in 1 L2P table entry, whereas for an SSD with a maximum sequential compression of X/5 bytes, the compression will result in 5 L2P table entries. The creation and storage of additional L2P table entries can be inefficient, particularly when they become large enough to exceed the cache and need to be stored in NVM. As such, in some aspects, the disclosed embodiments are directed to data storage systems, apparatuses, and methods configured to select target DSDs to minimize the number of L2P table entries generated for the VSP. To reduce the number of L2P table entries, the storage management device may receive L2P table information from the DSDs in the VSP.

Figure 3:
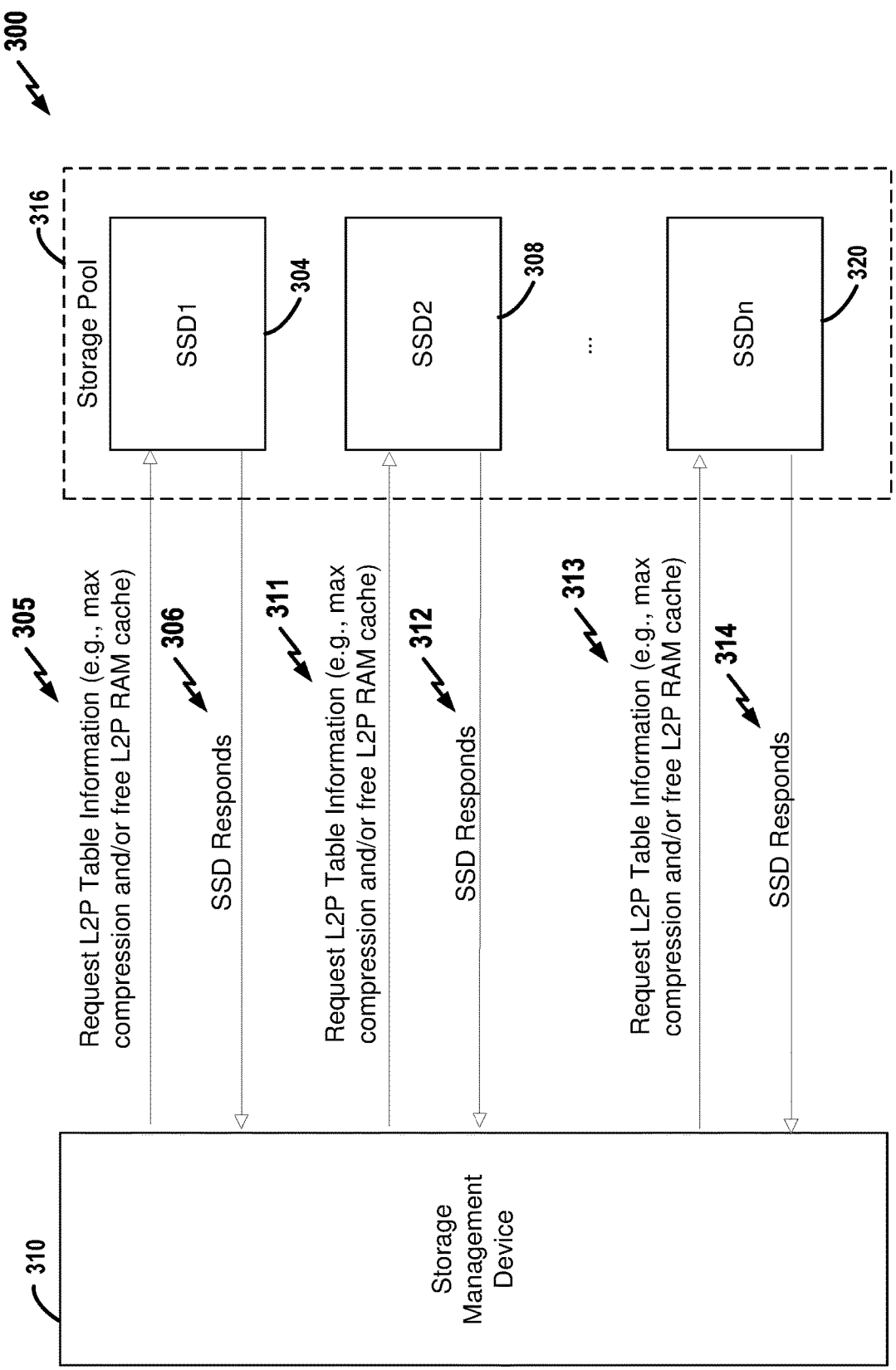
FIG. 3 is a schematic diagram illustrating the communication of L2P table information from SSDs to a storage management device in accordance with some aspects of the disclosure.

FIG. 3 is a schematic diagram illustrating the communication of L2P table information from SSDs to a storage management device in accordance with some aspects of the disclosure. The method 300 of communication in FIG. 3 could be used in conjunction with any of the DSDs described herein, including, for example, any of the DSDs in the storage pool, and any of the storage management devices described herein.

The diagram of FIG. 3 shows a storage management device 310. In certain embodiments the storage management device 310 can be implemented using a server, a layer on a server, storage management circuitry, a host device, a layer on a host device, storage management circuitry on a host device, and/or the like as detailed herein.

The diagram shows the storage management device 310 sending request 305 for L2P table information, to SSD1 304 in the storage pool. The SSD1 304 is configured to send a response 306 with L2P table information associated with SSD1 304. The L2P table information can include the maximum sequential compression amount for the L2P table associated with SSD1 304, and available space within a RAM cache for the L2P table associated with SSD1 304. The storage management device 310 can be configured to similarly send a request 311 to SSD2 308 and request 313 to SSDn 320 in the storage pool 316, as illustrated in the diagram. Each DSD in the storage pool 316 is configured to send a response with L2P table information associated with the DSD (e.g., SSD2 308 is configured to send response 312, and SSDn 320 is configured to send response 314).

For SSDs in the storage pool 316, the maximum sequential compression (or compression ratio) typically remains fixed, although it is possible it can change. In addition, the L2P RAM cache utilization for each SSD changes as the device is used. Accordingly, the storage management device can be configured to send requests 305, 311, and 313 for L2P table information periodically (or not periodically and possibly after a large write command was previously sent to an SSD), and the SSDs in the storage pool can be configured to respond with current L2P table information. The frequency of the periodic requests 305, 311, and 313 can be predefined and can be modified.

Figure 4:
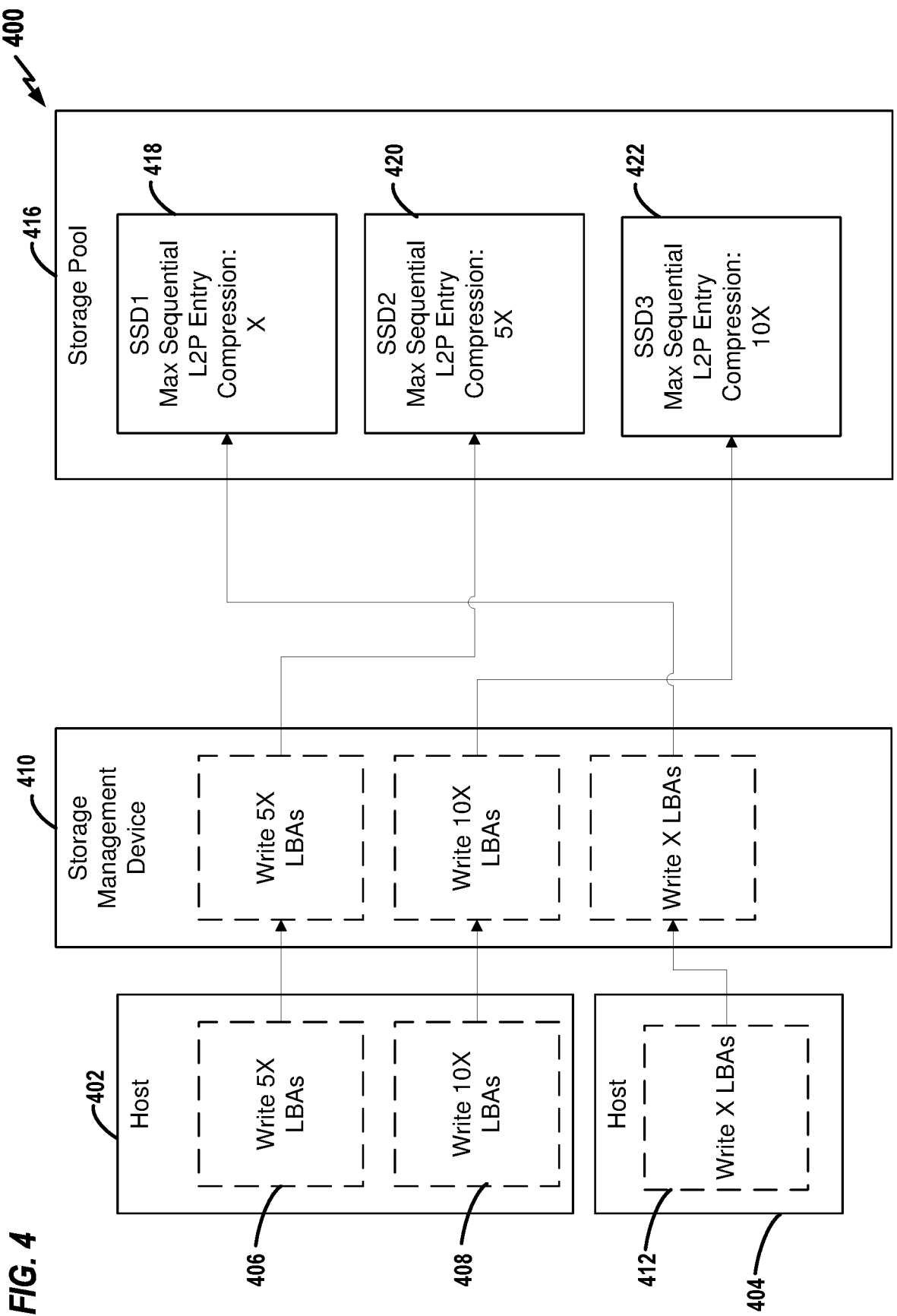
FIG. 4 is a schematic diagram illustrating a method for selecting a target SSD based on L2P table information (including a maximum compression of LBA ranges in L2P table entries) from the SSDs, and the host data to be stored in the SSDs in accordance with some aspects of the disclosure.

FIG. 4 is a schematic diagram illustrating a method 400 for selecting a target SSD based on L2P table information from the SSDs, and the data to be stored in the SSDs in accordance with some aspects of the disclosure. The method 400 could be used in conjunction with any of the DSDs in the storage pool as described herein. It should be appreciated that the values provided in FIG. 4 and method 400 (e.g., the number of write requests from the host 106, the number of DSDs in the VSP, and the maximum sequential compression for each the DSDs) are provided purely for illustrative purposes, and other values are possible, without departing from the scope of disclosure provided herein.

In this example, host 402 has two write commands; the first command 406 requires LBAs, the second command 408 requires 10X LBAs. Host 404 has a third command 412 which requires X LBAs. Although this example shows first command 406, second command 408, and third command 412 originating from two hosts 402 and 404, it should be understood that, in other embodiments, write commands can originate from additional hosts, and each host may have multiple write commands. The illustration in exemplary FIG. 4 of three write commands from two hosts is provided purely for purposes of illustration and conceptual simplicity. The storage management device 410 can be configured to receive (or fetch) each of the write commands including first command 406, second command 408, and third command 412. In this example, the storage management device 410 has received the L2P table information from each of the DSDs in the storage pool 416, according to the exemplary method 300, as illustrated in FIG. 3. The L2P table information can include the maximum sequential compression amount for each respective L2P table. The storage management device 410 is configured to select, based on the L2P table information (e.g., maximum sequential compression amount and a size of the host data) from the DSDs, a target DSD that will minimize a total number of new L2P table entries required to write the host data to the target DSD.

For example, for the first command 406, storage will require 5X LBAs. The storage management device 410 is configured to select SSD2 420 which has a maximum sequential compression of 5X. This will result in 1 new L2P table entry on SSD2 420. Note, if first command 406 were instead routed to SSD1 418, which has a maximum sequential compression of X, 5 L2P table entries would be required on SSD1 418. Likewise, if first command 406, were instead routed to SSD3 422, which has a maximum sequential compression of 10X, 1 L2P table entry would be required on SSD3 422. However, the storage management device 410 is configured to select SSD2 420 as the target device for first command 406 because second command 408 requires 10X LBAs. Therefore, routing first command 406 to SSD3 422 would only require 1 L2P table entry but second command 408 would then necessarily be routed to SSD1 418, which would require 10 L2P table entries, or to SSD2 which would require 2 L2P entries. Thus, in aggregate, routing first command 406 to SSD2 420, second command 408 to SSD3 422, and third command 412 to SSD1 418 results in the fewest total new L2P table entries in the storage pool 416. As such, the storage management device is configured to select SSD2 420 as the target device for first command 406, to select SSD3 422 as the target device for second command 408, and to select SSD1 418 as the target device for third command 412. More generally, the storage management device 410 is configured to minimize the total number of new L2P table entries required to write the host data to the target DSD. By configuring the storage management device 410 to select, based on the maximum sequential compression amount and the size of the host data, the target DSD that will minimize the total number of new L2P table entries required, the overall RAM usage in the storage pool 416 can be reduced.

The storage management device 410 can also be configured to select the target DSD having sufficient available space in the L2P RAM cache of the target DSD.

Figure 5:
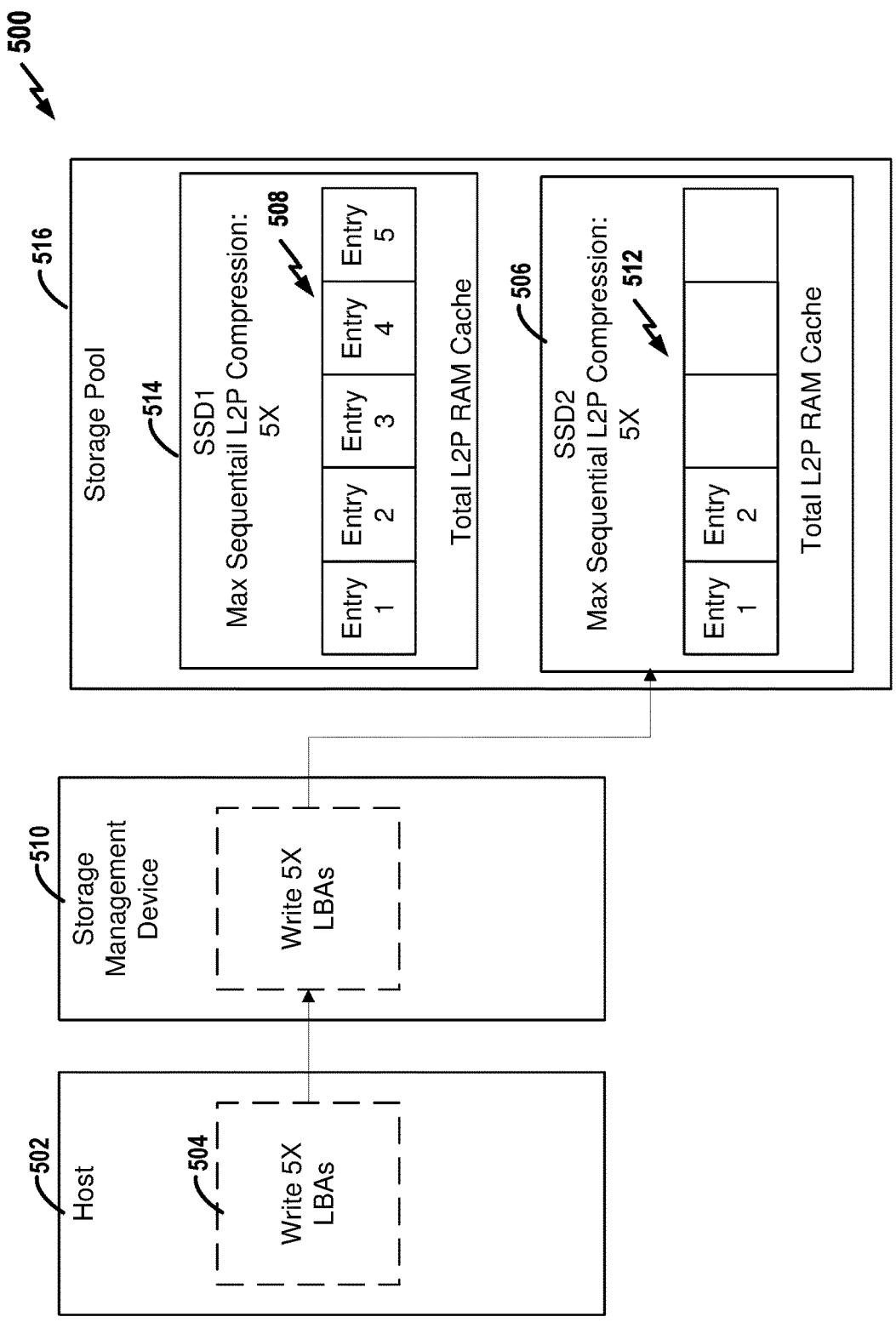
FIG. 5 is a schematic diagram illustrating another method for selecting a target SSD based on L2P table information from the SSDs, and the host data to be stored in the SSDs in accordance with some aspects of the disclosure.

FIG. 5 is a schematic diagram illustrating another method 500 for selecting a target DSD based on L2P table information from the DSDs, and the data to be stored in the DSDs in accordance with some aspects of the disclosure. The method 500 could be used in conjunction with any of the DSDs in the storage pool as described herein. It should be appreciated that the values provided in FIG. 5 and method 500 (e.g., the number of write commands from the host 502, the number of DSDs in the VSP, and the maximum sequential compression for each the DSDs) are provided purely for illustrative purposes, and other values are possible without departing from the scope of disclosure provided herein.

In this example, host 502 has a pending write command, embodied as first command 504, which requires 5X LBAs (e.g., 5X sequential LBAs). The storage management device 510 can be configured to receive the first command 504. In this example, the storage management device 510 is configured to receive the L2P table information from each of the DSDs in the storage pool according to method 300 illustrated in FIG. 3. The L2P table information can include the maximum sequential compression amount for each respective L2P tables as well as available space within the L2P RAM cache for each DSD in the storage pool 516.

In the method 500 the storage management device 510 is configured to select, based on the L2P table information from the DSDs, the target DSD having sufficient available space in the L2P RAM cache of the target DSD to store the number of L2P table entries required to write the host data to the target DSD.

For example, SSD1 514 has a maximum sequential compression of 5X and SSD2 506 has a maximum sequential compression of 5X. Thus, the total number of L2P table entries required for the DSDs in the storage pool 516 is equal. However, L2P RAM cache 508 of SSD1 514 is full. By contrast, the L2P RAM cache 512 of SSD2 506 has remaining space available, and enough space to accommodate first write command 504. Accordingly, the storage management device 510 selects, based on the L2P table information from the DSDs, SSD2 506 as the target storage device because SSD2 506 has sufficient available space in the L2P RAM cache 512 to store the number of L2P table entries required to write the host data to the target DSD SSD2 506. By selecting the target DSD having sufficient available space in the L2P RAM cache of the target DSD to store the required number of L2P table entries, unnecessary and inefficient table loading (e.g., loading or storing portions of the L2P in slower NVM) can be reduced.

Exemplary Storage Management Device Embodiments

Figure 6:
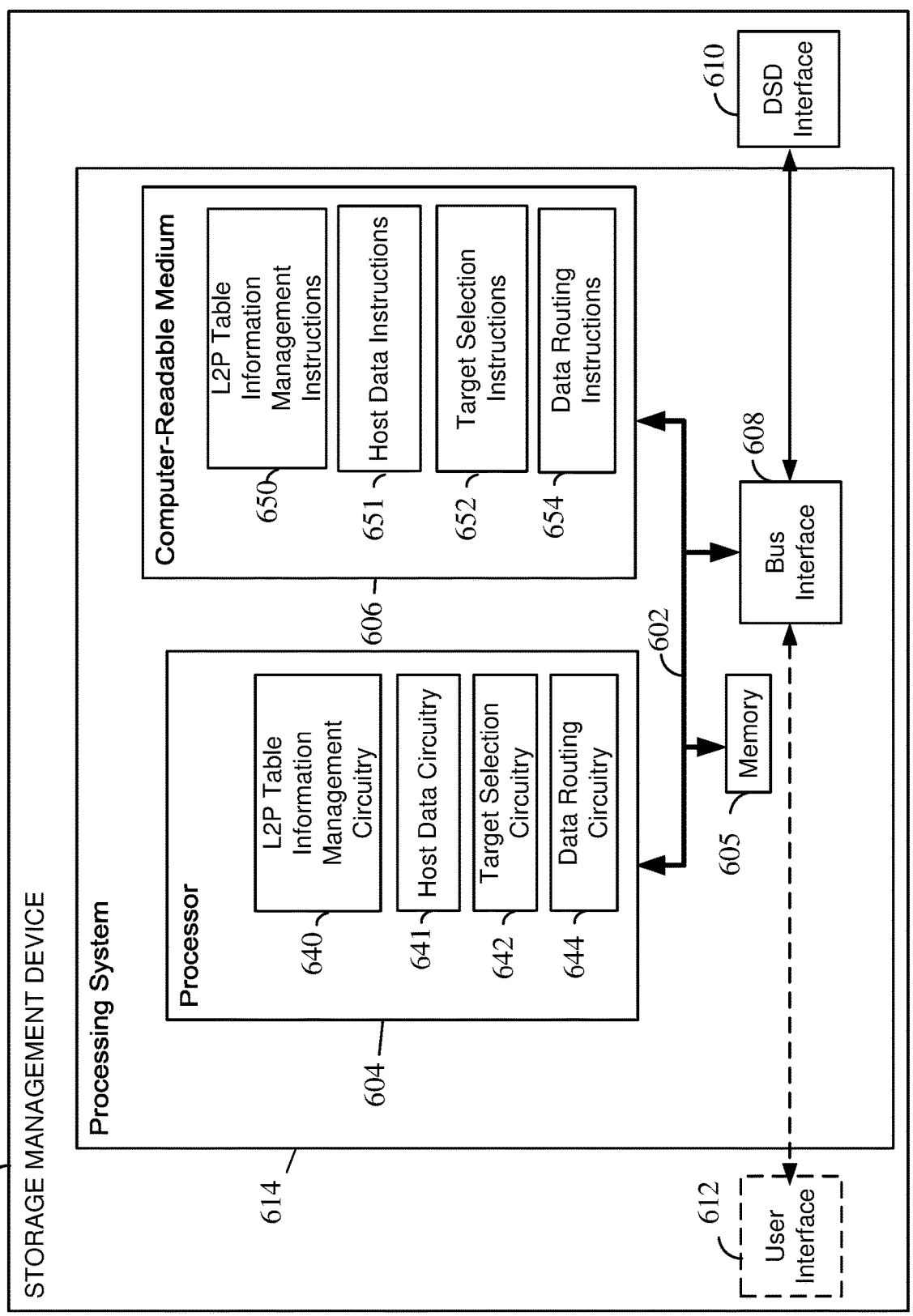
FIG. 6 is a schematic block diagram illustrating an exemplary storage management device and associated processing system in accordance with some aspects of the disclosure.

FIG. 6 is a schematic block diagram illustrating an exemplary storage management device and associated processing system in accordance with some aspects of the disclosure. In one example, the storage management device 600 may be a storage management device as illustrated in any of FIGS. 1, 11, and/or 12.

The storage management device 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the storage management device 600 may be configured to perform any one or more of the functions described herein. That is, the processor 604, as utilized in storage management device 600, may be used to implement any one or more of the processes and procedures described herein and illustrated in FIGS. 7-10.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable storage medium 606). The bus 602 may also link various other circuits such as timing sources, peripherals, voltage regulators, and power management circuits, which are well known in the art, and therefore, will not be described any further. A bus interface 608 provides an interface between the bus 602 and a DSD interface 610. The DSD interface 610 provides a communication interface or means for communicating with various other apparatus (e.g., various DSDs) over a transmission medium (such as between a host and a DSD as is described below as between host 1302 and host interface 1306 for FIG. 13). Depending upon the nature of the apparatus, a user interface 612 (e.g., keypad, display, speaker, microphone, joystick) may also be provided. Of course, such a user interface 612 is optional, and may be omitted in some examples.

In some aspects of the disclosure, the processor 604 may include L2P table information management circuitry 640 configured for various functions, including, for example, receiving and processing L2P table information received from two or more DSDs. For example, the L2P table information management circuitry 640 may be configured to implement one or more of the functions described below in relation to FIGS. 7-10, including, e.g., block 702. The L2P table information management circuitry 640 can periodically receive L2P table information from the plurality of DSDs.

In some aspects, the processor 604 may include host data circuitry 641 configured for various functions, including, for example, receiving and processing host data to be stored in one or more DSDs, or receiving data from DSDs in conjunction with read commands from hosts. For example, the host data circuitry 641 may be configured to implement one or more of the functions described below in relation to FIG. 7, including, e.g., block 704.

In some aspects, the processor 604 may include target selection circuitry 642 configured for various functions, including, for example, selecting, based on the L2P table information, the target DSD. This may be based on the maximum sequential compression amount and size of the host data. The target DSD selected may be the one that will minimize a total number of new L2P table entries required to write the host data to the target DSD. The target selection circuitry 642 may also be configured for selecting, based on the L2P table information, the target DSD having sufficient available space in its L2P RAM cache to store the number of L2P table entries required to write the host data. For example, the target selection circuitry 642 may be configured to implement one or more of the functions described below in relation to FIGS. 7-10, including, e.g., blocks 706, 802, 804, 806, 808, 902, 904, 906, 908, 910, 1002, 1004, 1006, 1008, 1010, 1012, and 1014.

In some aspects, the processor 604 may include data routing circuitry 644 configured for various functions, including, for example, sending host data to the target storage device. For example, the target selection circuitry 642 may be configured to implement one or more of the functions described below in relation to FIG. 7 including, e.g., block 708.

The processor 604 is responsible for managing the bus 602 and general processing, including the execution of software stored on the computer-readable storage medium 606. The software, when executed by the processor 604, causes the processing system 614 to perform the various functions described below for any particular apparatus. The computer-readable storage medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 606. The computer-readable storage medium 606 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a RAM, a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 606 may reside in the processing system 614, external to the processing system 614, or distributed across multiple entities including the processing system 614. The computer-readable storage medium 606 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the computer-readable storage medium 606 may include L2P table information management software/instructions 650 configured for various functions, including, for example, to receive L2P table information from at least two of a plurality of DSDs. For example, the L2P table information management software/instructions 650 may be configured to implement one or more of the functions described below in relation to FIGS. 7-10, including, e.g., blocks 702.

In some aspects, the L2P table information management software/instructions 650 may be configured for various functions, including, for example, receiving L2P table information including a maximum sequential compression amount for a respective L2P table and/or available space within a RAM cache for a respective L2P table. For example, the L2P table information management software/instructions 650 may be configured to implement one or more of the functions described below in relation to FIGS. 7-10, including, e.g., block 702.

In some aspects of the disclosure, the computer-readable storage medium 606 may include host data software/instructions 651 configured for various functions, including, for example, to receive host data from one or more hosts. For example, the host data software/instructions 651 may be configured to implement one or more of the functions described below in relation to FIG. 7, including, e.g., blocks 704.

In some aspects of the disclosure, the computer-readable storage medium 606 may include target selection software/instructions 652 configured for various functions, including, for example, to select, based on the L2P table information the target DSD based on the maximum sequential compression amount and size of the host data, the target DSD that will minimize a total number of new L2P table entries required to write the host data to the target DSD. Likewise, the target selection software/instructions 652 can be configured for selecting, based on the L2P table information, the target DSD having sufficient available space in its L2P RAM cache to store the number of L2P table entries required to write the host data to the target DSD. For example, the host data software/instructions 652 may be configured to implement one or more of the functions described below in relation to FIGS. 7-10, including, e.g., blocks 706, 802, 804, 806, 808, 902, 904, 906, 908, 910, 1002, 1004, 1006, 1008, 1010, 1012, and 1014.

In some aspects of the disclosure, the computer-readable storage medium 606 may include data routing software/ instructions 654 configured for various functions, including, for example, to send the host data to the target DSD. For example, the host data software/instructions 654 may be configured to implement one or more of the functions described below in relation to FIG. 7, including, e.g., blocks 708.

Figure 7:
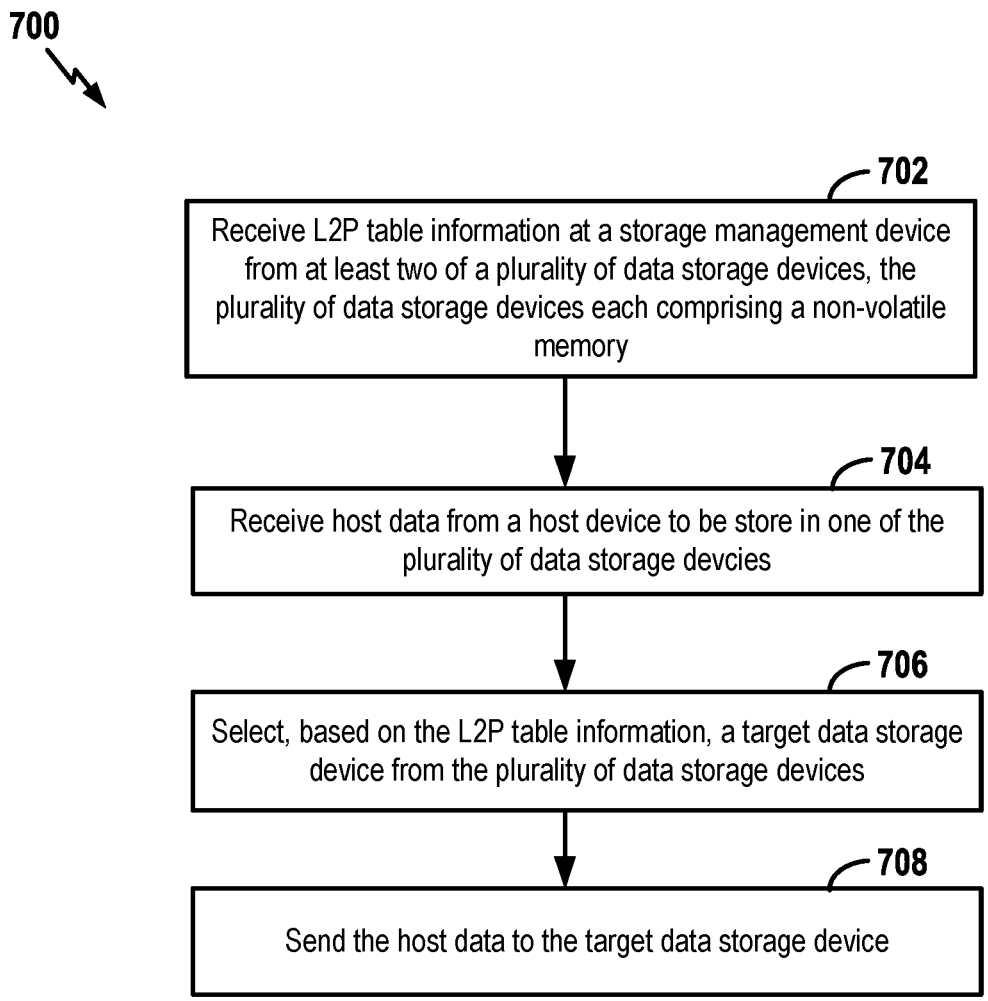
FIG. 7 is a flowchart illustrating a method for data storage that may be performed by a storage management device in accordance with some aspects of the disclosure.

FIG. 7 is a flowchart illustrating a method 700 for data storage that may be performed by a storage management device in accordance with some aspects of the disclosure. In one aspect, the method/process 700 may be performed by the storage management devices of any of FIG. 1, FIG. 6, FIG. 11, or FIG. 13, the storage management layer of FIG. 1, the hosts 102 or 104 of FIG. 1, or any other suitably equipped device controller.

At block 702, the process receives L2P table information at a storage management device from at least two of the DSDs in the storage pool. In an aspect the DSDs include NVM (e.g., NVM arrays). The L2P table information can include a maximum sequential compression amount for each respective L2P table, an available space within a RAM cache of the respective L2P table, or a combination thereof. In an aspect, the process periodically receives the L2P table information from at least one of the plurality of DSDs. The frequency of the periodic requests can be predefined and can be modified.

At block 704 the process further receives data from a host device to be stored in one of the plurality of DSDs. It should be appreciated that the actions illustrated in block 702 and the actions illustrated at 704 may be implemented in another order. For example, the process can receive data from the host device to be stored in one of the plurality of DSDs at any time, including before the process receives the L2P table information. Likewise, the L2P table information can be received at a storage management device at any time in the process without departing from the scope disclosed herein. In certain aspects the process includes periodically receiving L2P table information. In certain aspects the process includes periodically receiving host data.

At block 706 the process selects, based on the L2P table information, a target DSD from the plurality of DSDs. Aspects of selecting the target DSD from the plurality of DSD are illustrated in FIG. 8, FIG. 9, and FIG. 10.

Figure 8:
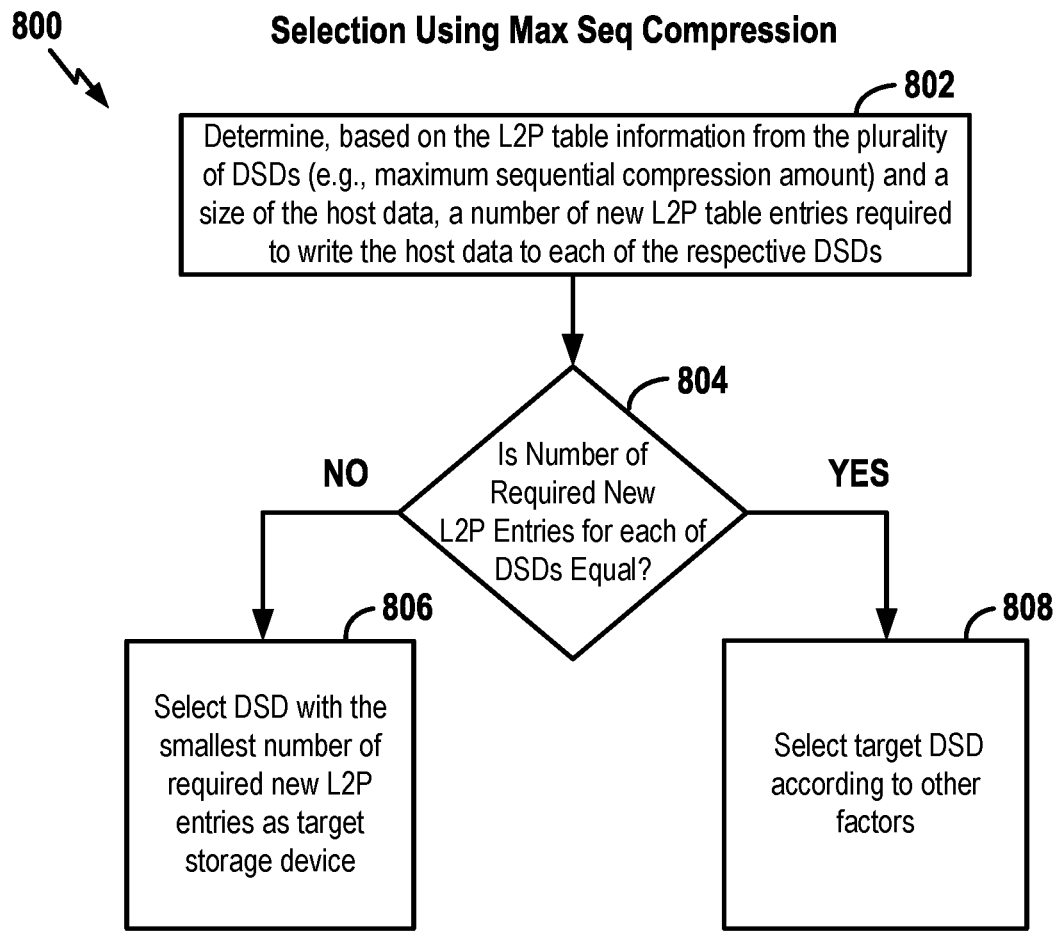
FIG. 8 is a flowchart illustrating a method for selecting a target storage device using maximum sequential compression in accordance with some aspects of the disclosure.

FIG. 8 is a flowchart illustrating a method 800 for selecting a target storage device using maximum sequential compression in accordance with some aspects of the disclosure. In one aspect, this method can be used at block 706 for target DSD selection. At block 802, the process determines, based on the L2P table information from the plurality of DSDs and the size of the host data, the number of new L2P table entries required to write data to each of the DSDs in the storage pool. The L2P table information includes the maximum sequential compression amount for a respective L2P table and an available space within a RAM cache of the respective L2P tables. At block 804, the process determines if the number of required entries for two or more of the DSDs is equal. If not, the process selects the target DSD such that total number of new L2P table entries required to store the data in the target DSD is minimized at block 806. If the number of required new L2P entries for two or more of the DSDs is equal, L2P compression does not influence the DSD target selection decision in block 808. In this case the DSD can be selected either randomly or according to a best perceived fit by the storage management device. It should be appreciated that in some aspects selecting the target DSD may be a consequence of other factors.

The process/method 800 can further account for the total new L2P table entries that will be required for a given set of queued host data. In such a circumstance, for example as illustrated in FIG. 4, multiple host write commands may be queued (e.g., at the host or at the storage management device). In such an example, the process can select, based on the queued write commands and the maximum sequential compression of each of the SSDs in the storage pool, multiple target DSDs such that the total number of new L2P table entries required to store the host data in the target DSDs is minimized. It should be appreciated that, in some aspects, the method 800 can be applied to select multiple target DSDs, such that the total number of new L2P table entries required to store the host data in the target DSDs is minimized at block 806. This can include distributing the host data across multiple target DSDs to minimize the total number of new L2P table entries.

Figure 9:
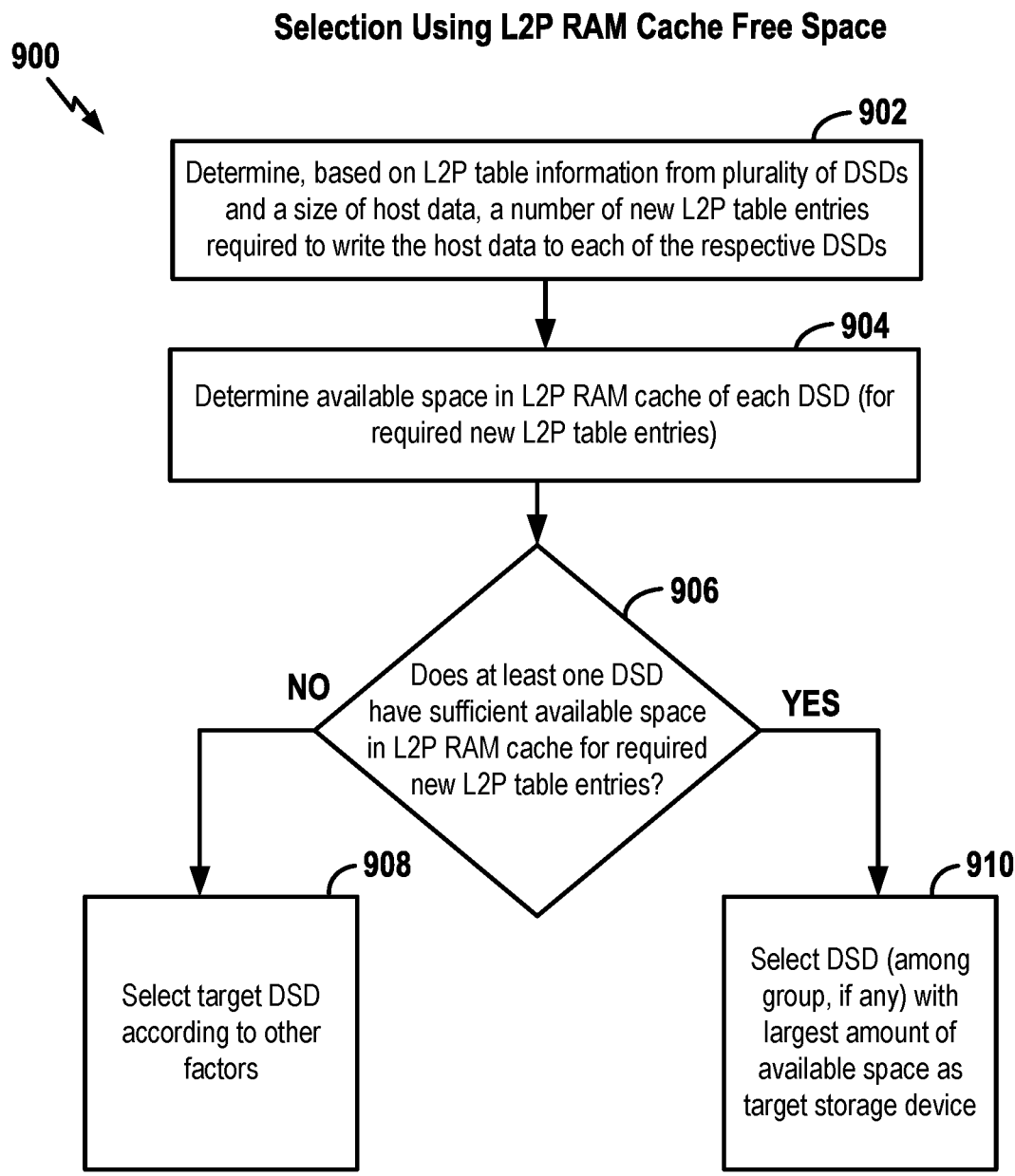
FIG. 9 is a flowchart illustrating another method for selecting a target storage device using available space in L2P RAM cache in accordance with some aspects of the disclosure.
Figure 10:
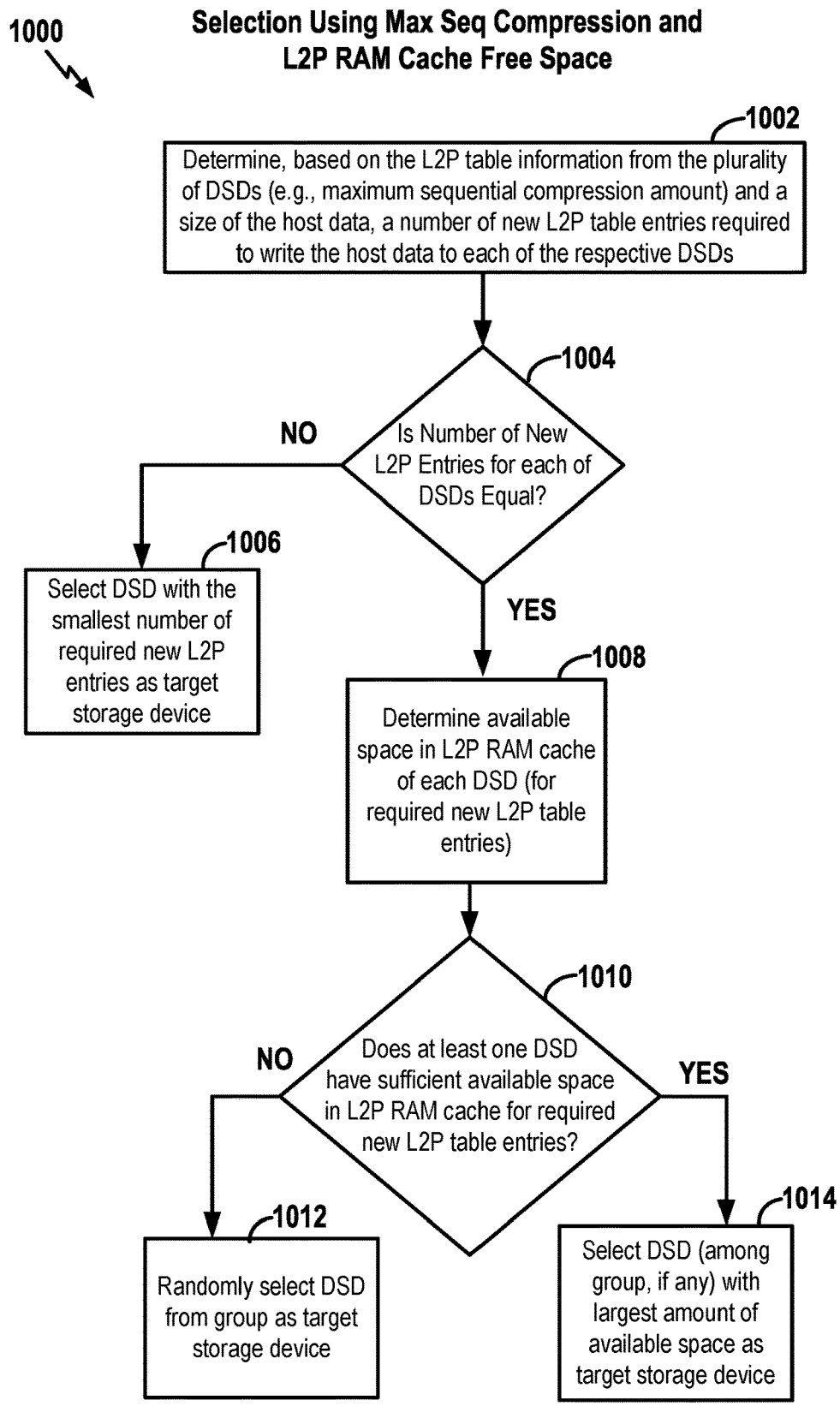
FIG. 10 is a flowchart illustrating another method for selecting a target storage device using both maximum sequential compression and available space in L2P RAM cache in accordance with some aspects of the disclosure.

FIG. 9 is a flowchart illustrating another method 900 for selecting a target storage device using available space in L2P RAM cache in accordance with some aspects of the disclosure. In one aspect, this method can be used at block 706 for target selection. At block 902 the method includes determining, based on the L2P table information from the plurality of DSDs, and the size of the host data, the number of new L2P table entries required to write the host data to each of the DSDs in the storage pool. In this case the L2P table information includes available space within a RAM cache of the respective L2P table.

At block 904 the process includes determining the available space in the L2P RAM cache of each DSD.

At block 906 the process includes determining if at least one DSD has sufficient available space in the L2P RAM cache for the required new L2P table entries. If one or more of the DSDs have sufficient available space in the L2P RAM cache for the required new L2P entries, at block 910 the process includes selecting the target DSD(s) from the group of DSDs having sufficient available space in the L2P RAM cache of the target DSD to store the required number of L2P table entries required to write the host data to the target DSD. If none of the DSDs have sufficient available space in the L2P RAM cache for the required new L2P entries, at block 908, the L2P RAM cache availability does not influence the selection of the target DSD. In this case the DSD can be selected either randomly or according to a best perceived fit by the storage management device. It should be appreciated that in some aspects selecting the target DSD may be a consequence of other factors.

FIG. 10 is a flowchart illustrating another method for selecting a target storage device using both maximum sequential compression and available space in L2P RAM cache in accordance with some aspects of the disclosure. In one aspect, this method can be used at block 706 for target selection. At block 1002 the method includes determining, based on the L2P table information from the plurality of DSDs, and the size of the host data, the number of new L2P table entries required to write the host data to each of the DSDs in the storage pool. In this case the L2P table information includes available space within a RAM cache of the respective L2P table and the maximum sequential compression amount for a respective L2P table. At block 1004 the process includes determining if the number of new L2P entries required for each of the DSDs in the storage pool is equal. If the number of new L2P entries required for each of the DSDs is not equal, the process includes selecting, based on the maximum sequential compression amount and the size of the host data, the target DSD(s) that will minimize a total number of new L2P table entries required to write the host data to the target DSD at block 1006. If the number of new L2P entries required for each of the DSDs is equal, the process further includes determining if at least one of the DSDs has sufficient space in the L2P RAM cache for the required new L2P table entries at block 1010. If one or more of the DSDs have sufficient available space in the L2P RAM cache for the required new L2P entries, at block 1014 the process includes selecting the target DSD(s) from the group of DSDs having sufficient available space in the L2P RAM cache of the target DSD to store the required number of L2P table entries required to write the data to the target DSD. If none of the DSDs have sufficient available space in the L2P RAM cache for the required new L2P entries, at block 1012 the process includes randomly selecting one or more DSDs from the storage pool as the target storage device.

Figure 11:
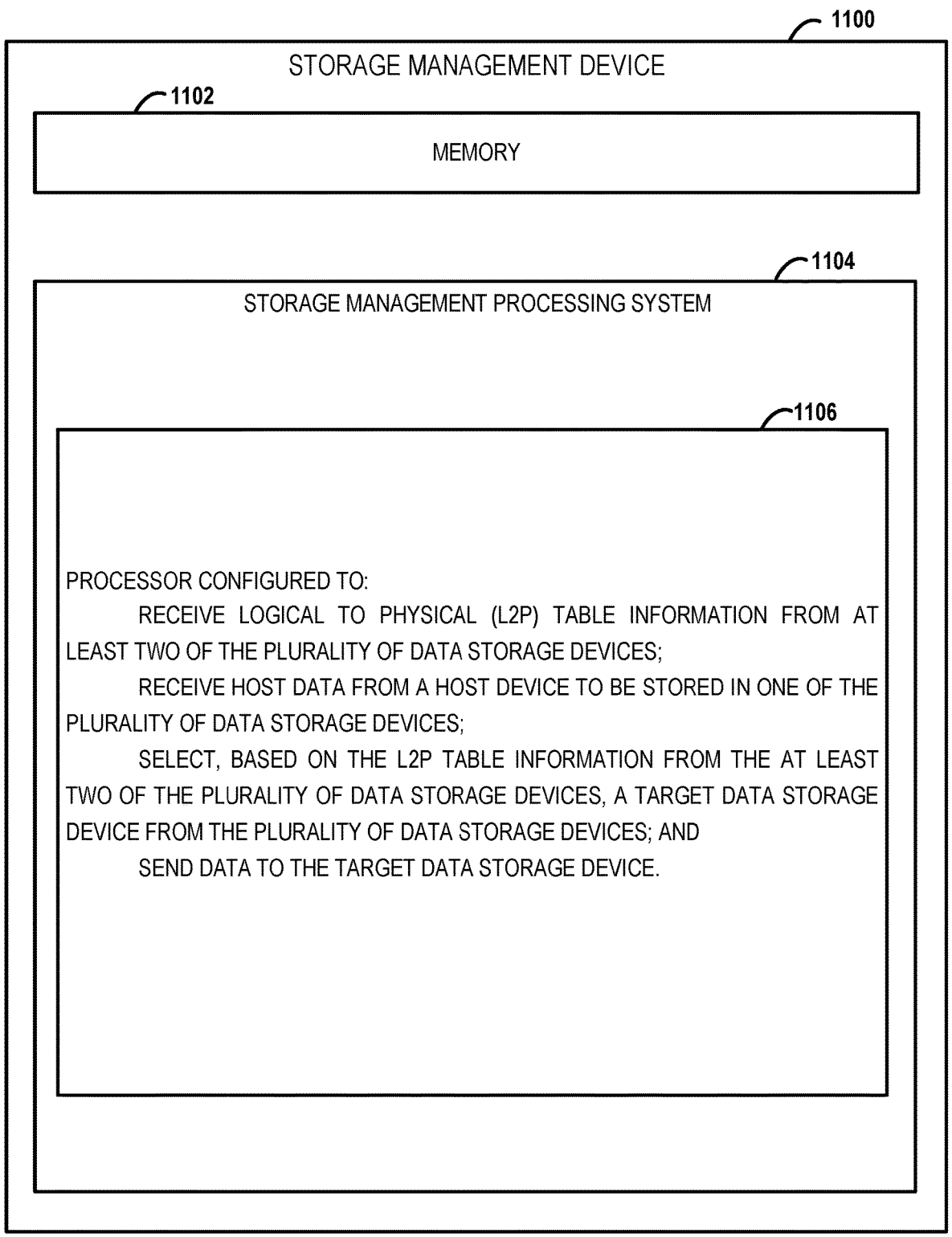
FIG. 11 is a schematic block diagram illustrating an exemplary storage management device configured to select a target DSD and send data to the target DSD in accordance with some aspects of the disclosure.

FIG. 11 is a schematic block diagram illustrating an exemplary storage management device 1100 configured to perform data storage and/or L2P table management in accordance with some aspects of the disclosure. The storage management device 1100 includes memory which can include a NVM and a storage management processing system 1104. The storage management processing system 1104 includes a processor or processing circuit 1106 configured to: receive L2P table information at a storage management device from the plurality of DSDs, the plurality of DSDs each comprising a NVM; receive host data from a host device to be stored in one or more of the plurality of DSDs; select, based on the L2P table information, a target DSD from the plurality of DSDs; and send the host data to the target DSD.

The processor 1106 may also be configured to receive L2P table information comprising a maximum sequential compression amount for a respective L2P table and/or an available space within a RAM cache of the respective L2P table.

The processor 1106 may also be configured to select, based on the maximum sequential compression amount and a size of the data, the target DSD that will minimize a total number of new L2P table entries required to write the host data to the target DSD.

The processor 1106 may also be configured to select, based on available space within a RAM cache of the respective L2P table, the target DSD having sufficient available space in the L2P RAM cache of the target DSD to store the required number of L2P table entries to write the host data to the target DSD.

The processor 1106 may also be configured to select the target DSD such that a total number of new L2P table entries required to store the host data in the target DSD is minimized.

The processor 1106 may also be configured to periodically receive L2P table information from at least one of the plurality of DSDs.

Figure 12:
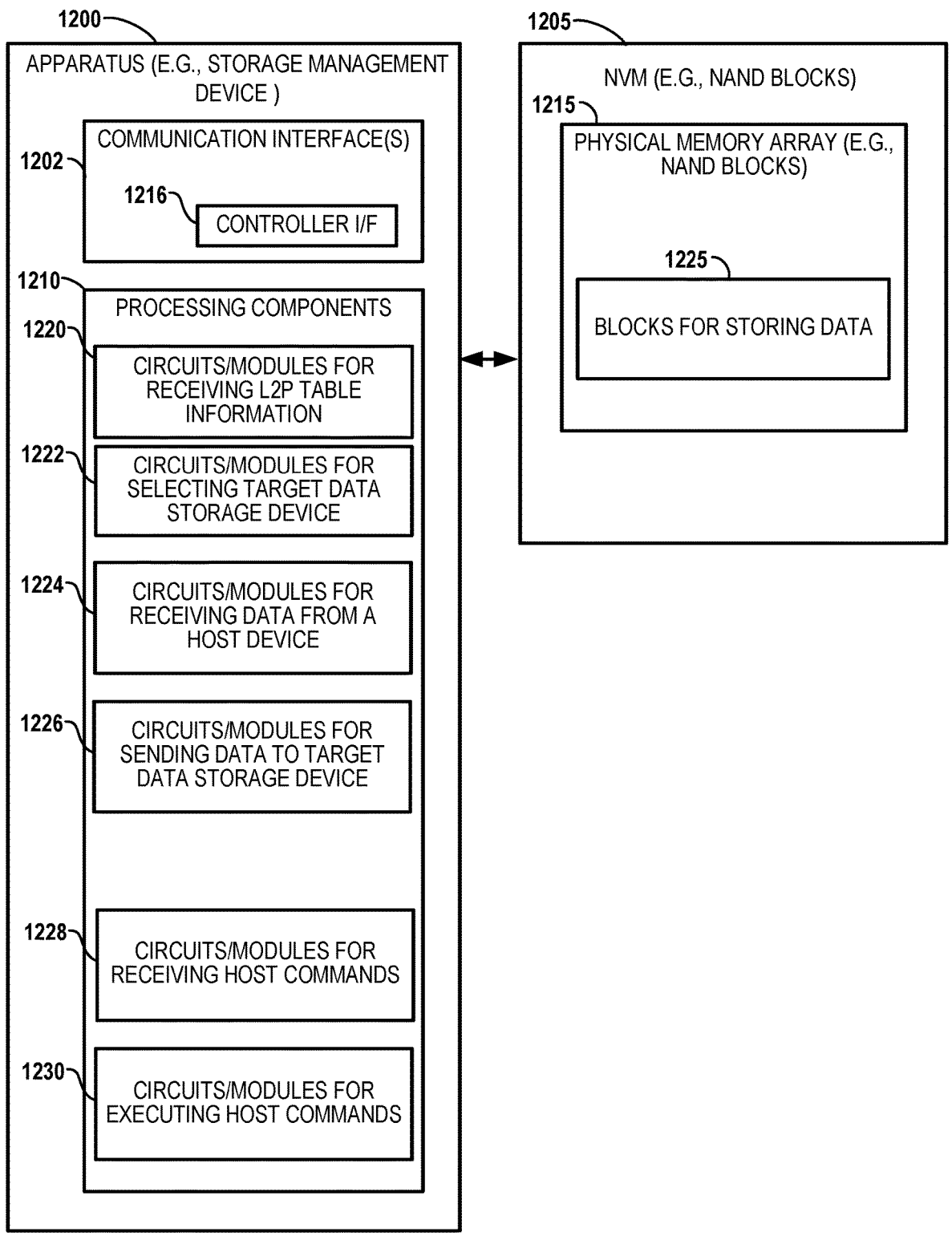
FIG. 12 is a schematic block diagram configuration for an exemplary storage management device configured to select a target DSD and send data to the target DSD in accordance with some aspects of the disclosure.

FIG. 12 is a schematic block diagram configuration for an exemplary storage management device 1200 configured to manage data storage in accordance with some aspects of the disclosure. The apparatus 1200, or components thereof, could embody or be implemented within a data storage controller such as a DSD controller coupled to a volatile memory (not shown) and a NAND die or some other type of NVM array that supports data storage. In various implementations, the apparatus 1200, or components thereof, could be a component of a processor, a controller, a computing device, a personal computer, a portable device, workstation, a server, a personal digital assistant, a digital camera, a digital phone, an entertainment device, a medical device, a self-driving vehicle control device, an edge device, or any other electronic device that stores, processes, or uses data.

The apparatus 1200 includes a communication interface 1202 and is coupled to a NVM 1205 (e.g., a NAND die). The NVM 1205 includes physical memory array 1215. These components can be coupled to and/or placed in electrical communication with one another via suitable components, represented generally by the connection line in FIG. 12. Although not shown, other circuits such as timing sources, peripherals, voltage regulators, and power management circuits may be provided, which will not be described any further. Additional components, such as those shown in FIG. 6, may also be included with apparatus 1200.

The communication interface 1202 of the apparatus 1200 provides a means for communicating with other apparatuses over a transmission medium. In some implementations, the communication interface 1202 includes circuitry and/or programming (e.g., a program) adapted to facilitate the communication of information bi-directionally with respect to one or more devices in a system. In some implementations, the communication interface 1202 may be configured for wire-based communication. For example, the communication interface 1202 could be a bus interface, a send/receive interface, or some other type of signal interface including circuitry for outputting and/or obtaining signals (e.g., outputting signal from and/or receiving signals into a DSD). The communications interface 1202 can include a controller I/F 1216.

The physical memory array 1215 may include one or more NAND blocks 1225, or other suitable NVM blocks. The physical memory array 1215 may be accessed by the processing components 1210.

In one aspect, the apparatus 1200 may also include volatile memory for storing instructions and other information to support the operation of the processing components 1210.

The apparatus 1200 includes various processing components 1210 arranged or configured to obtain, process and/or send data, control data access and storage, issue or respond to commands, and control other desired operations. For example, the components 1210 may be implemented as one or more processors, one or more controllers, and/or other structures configured to perform functions. According to one or more aspects of the disclosure, the components 1210 may be adapted to perform any or all of the features, processes, functions, operations and/or routines described herein. For example, the components 1210 may be configured to perform any of the steps, functions, and/or processes described with respect to FIGS. 1-9. As used herein, the term "adapted" in relation to components 1210 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with FIGS. 1-9. The components 1210 serve as an example of a means for processing. In various implementations, the components 1210 may provide and/or incorporate, at least in part, functionality described above for the storage management device 110 of FIG. 1, storage management device 600 of FIG. 6, or storage management device 900 of FIG. 9.

According to at least one example of the apparatus 1200, the processing components 1210 may include one or more of: circuit/modules 1220 configured for receiving L2P table information; circuits/modules 1222 configured for selecting a target storage device; circuits/modules 1224 configured for receiving host data from a host device to be stored in one of the plurality of DSDs; circuits/modules 1226 configured for sending data to target DSDs; circuits/modules 1228 for receiving host commands; and circuits/modules 1230 for executing host commands.

The physical memory array 1215 may include blocks 1240 for storing host data.

In at least some examples, means may be provided for performing the functions illustrated in FIG. 9 and/or other functions illustrated or described herein. For example, the means may include one or more of: means, such as circuit/module 1220, for receiving L2P table information at a storage management device from the plurality of DSDs, the plurality of DSDs each comprising a NVM; and/or means, such as circuit/module 1222, for selecting, based on the L2P table information and a size of the host data, a target DSD from the plurality of DSDs; means, such as circuit/module 1224, for receiving host data from a host device to be stored in one of the plurality of DSDs; and; and means, such as circuit/module 1226, for sending the host data to the target DSD.

In at least some other examples, means may be provided for performing the functions illustrated in FIG. 9 and/or other functions illustrated or described herein. For example, the means may include one or more of: means, such as circuit/module 1220, for receiving L2P table information at a storage management device from at least two of a plurality of DSDs, the plurality of DSDs each comprising a NVM; means, such as circuit/module 1222, for selecting, based on the L2P table information and a size of the host data, a target DSD from the plurality of DSDs; means, such as circuit module 1224, for receiving host data from a host device to be stored in one of the plurality of DSDs; means such as circuit/module 1226 for sending the host data to the target DSD; means, such as circuit/module 1222 for selecting, based on the maximum sequential compression amount and a size of the data, the target DSD that will minimize a total number of new L2P table entries required to write the data to the target DSD; means, such as circuit/module 1222 for selecting the target DSD having sufficient available space in the L2P RAM cache of the target DSD to store a required number of L2P table entries required to write the data to the target DSD; means, such as circuit/module 1222 for selecting the target DSD such that a total number of new L2P table entries required to store the data in the target DSD is minimized; means, such as circuit/module 1220, for periodically receiving L2P table information from at least one of the plurality of DSDs.

In the examples of FIGS. 1-12, NAND memory is sometimes set forth as an exemplary NVM. In one aspect, the NVM may be flash memory or another suitable NVM, examples of which are noted above at the beginning of the Detailed Description section.

Figure 13:
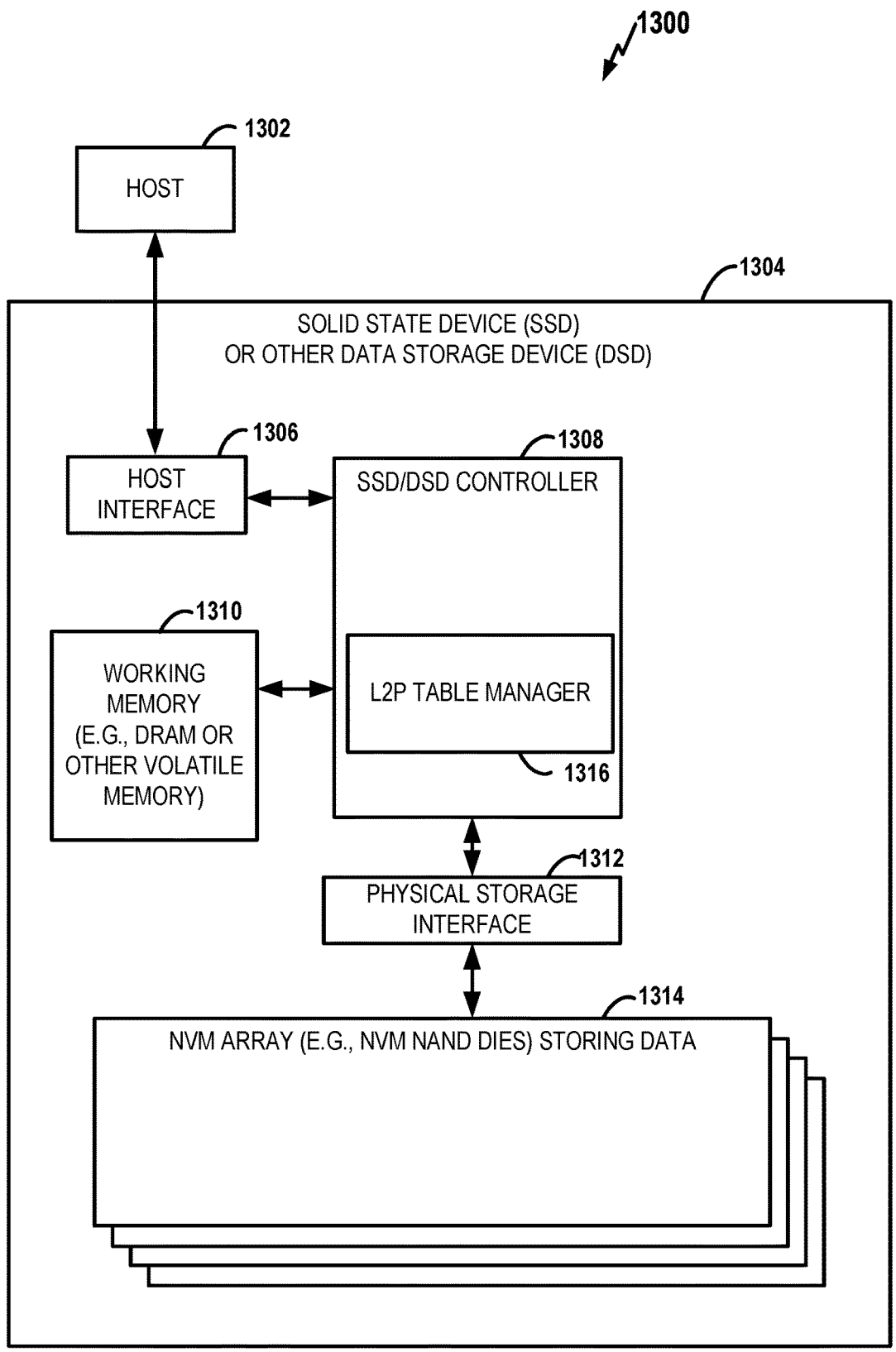
FIG. 13 is a schematic block diagram illustrating an exemplary DSD embodied as an SSD including an SSD controller configured to manage L2P tables in accordance with some aspects of the disclosure.

FIG. 13 is a schematic block diagram illustrating an exemplary DSD embodied as an SSD including an SSD controller configured to manage L2P tables. The system 1300 includes a host 1302 and the SSD 1304 (or other DSD, but for simplicity referred to as an SSD below) coupled to the host 1302. The host 1302 provides commands to the SSD 1304 for transferring host data between the host 1302 and the SSD 1304. For example, the host 1302 may provide a write command to the SSD 1304 for writing data to the SSD 1304 or read command to the SSD 1304 for reading data from the SSD 1304. The host 1302 may be any system or device having a need for data storage or retrieval and a compatible interface for communicating with the SSD 1304. For example, the host 1302 may be a computing device, a personal computer, a portable computer, a workstation, a server, a personal digital assistant, a digital camera, or a digital phone as merely a few examples.

The SSD 1304 includes a host interface 1306, an SSD or DSD controller 1308, a working memory 1310 (such as DRAM or other volatile memory), a physical storage (PS) interface 1312 (e.g., flash interface module (FIM)), and an NVM array 1314 having one or more dies storing data. The host interface 1306 is coupled to the controller 1308 and facilitates communication between the host 1302 and the controller 1308. The controller 1308 is coupled to the working memory 1310 as well as to the NVM array 1314 via the PS interface 1312. The host interface 1306 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, Secure Digital (SD), or the like. In some embodiments, the host 1302 includes the SSD 1304. In other embodiments, the SSD 1304 is remote from the host 1302 or is contained in a remote computing system communicatively coupled with the host 1302. For example, the host 1302 may communicate with the SSD 1304 through a wireless communication link. The NVM array 1314 may include multiple dies.

In some examples, the host 1302 may be a laptop computer with an internal SSD and a user of the laptop may wish to playback video stored by the SSD. In another example, the host again may be a laptop computer, but the video is stored by a remote server.

Although, in the example illustrated in FIG. 13, SSD 1304 includes a single channel between controller 1308 and NVM array 1314 via PS interface 1312, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 1308 may be implemented in a single integrated circuit chip and may communicate with different layers of memory in the NVM 1314 over one or more command channels.

The controller 1308 controls operation of the SSD 1304. In various aspects, the controller 1308 receives commands from the host 1302 through the host interface 1306 and performs the commands to transfer data between the host 1302 and the NVM array 1314. Furthermore, the controller 1308 may manage reading from and writing to working memory 1310 for performing the various functions effected by the controller and to maintain and manage cached information stored in the working memory 1310.

The controller 1308 may include any type of processing device, such as a microprocessor, a microcontroller, an embedded controller, a logic circuit, software, firmware, or the like, for controlling operation of the SSD 1304. In some aspects, some or all of the functions described herein as being performed by the controller 1308 may instead be performed by another element of the SSD 1304. For example, the SSD 1304 may include a microprocessor, a microcontroller, an embedded controller, a logic circuit, software, firmware, application specific integrated circuit (ASIC), or any kind of processing device, for performing one or more of the functions described herein as being performed by the controller 1308. According to other aspects, one or more of the functions described herein as being performed by the controller 1308 are instead performed by the host 1302. In still further aspects, some or all of the functions described herein as being performed by the controller 1308 may instead be performed by another element such as a controller in a hybrid drive including both NVM elements and magnetic storage elements. The SSD controller 1308 includes an L2P table manager 1316, which can be configured to perform L2P table management as described herein. In one aspect, the L2P table manager 1316 can store L2P table information in suitable memory such as the NVM array 1314. In one aspect, the L2P table manager 1316 is a module within the SSD controller 1308 that is controlled by firmware. In one aspect, the L2P table manager 1316 may be a separate component from the SSD controller 1308 and may be implemented using any combination of hardware, software, and firmware (e.g., like the implementation options described above for SSD controller 1308) that can perform L2P table management as described herein. In one example, the L2P table manager 1316 is implemented using a firmware algorithm or other set of instructions that can be performed on the SSD controller 1308 to implement the L2P table management functions described herein.

The working memory 1310 may be any suitable memory, computing device, or system capable of storing data. For example, working memory 1310 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 1308 uses the working memory 1310, or a portion thereof, to store data during the transfer of data between the host 1302 and the NVM array 1314. For example, the working memory 1310 or a portion of the volatile memory 1310 may be used as a cache memory. The NVM array 1314 receives data from the controller 1308 via the PS interface 1312 and stores the data. In some embodiments, working memory 1210 may be replaced by a NVM such as MRAM, PCM, ReRAM, etc. to serve as a working memory for the overall device.

The NVM array 1314 may be implemented using flash memory (e.g., NAND flash memory). In one aspect, the NVM array 1314 may be implemented using any combination of NAND flash, PCM arrays, MRAM arrays, and/or ReRAM.

The PS interface 1312 provides an interface to the NVM array 1314. For example, in the case where the NVM array 1314 is implemented using NAND flash memory, the PS interface 1312 may be a FIM. In one aspect, the PS interface 1312 may be implemented as a component of the SSD controller 1308.

In the example of FIG. 13, the controller 1308 may include hardware, firmware, software, or any combinations thereof that provide the functionality for the L2P table manager 1316.

Although FIG. 13 shows an exemplary SSD, and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components. As another example, the SSD controller 1308 may be a controller in another type of device and still be configured to perform or control L2P table management and perform some or all of the other functions described herein.

Figure 14:
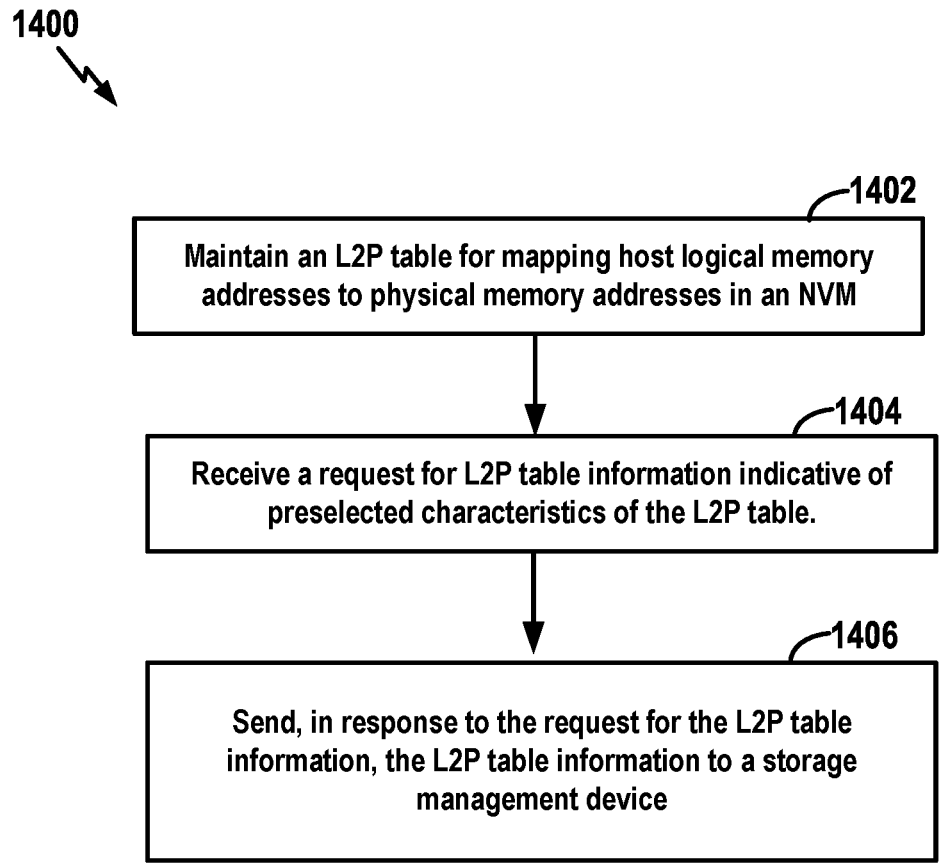
FIG. 14 is a flowchart illustrating a method for managing an L2P table that may be performed by a controller of a DSD in accordance with some aspects of the disclosure.

FIG. 14 is a flowchart illustrating a method/process 1400 for managing an L2P table that may be performed by a controller of an SSD in accordance with some aspects of the disclosure. In one aspect, the method/process 1400 may be performed by the SSD/DSD controller 1308 (or L2P table manager 1316) of FIG. 13, the DSD controller 1504 of FIG. 15, the DSD controller 1600 of FIG. 16, or any other suitably equipped device controller. The NVM described for process 1400 can be the working NVM of the SSD such as NVM arrays 1314 of FIG. 13, NVM 1502 of FIG. 15, or NVM 1601 of FIG. 16.

At block 1402, the method/process 1400 maintains an L2P table for mapping host logical memory addresses to physical memory addresses in an NVM. The method/processes receives a request for L2P table information indicative of preselected characteristics of the L2P table at block 1404. The method/process 1400 then sends, responsive to the request for the L2P table information, the L2P table information to a storage management device (e.g., storage management device 110 illustrated in FIG. 1, storage management device 310 at FIG. 3, storage management device 410 at FIG. 4, storage management device 600 illustrated in FIG. 6, storage management device 1100 illustrated in FIG. 11, or the combination of apparatus 1600 and NVM 1601 illustrated in FIG. 16) at block 1406. Various other aspects for method/process 1400 are also contemplated. For instance, in a particular embodiment, method/process 1400 may include additional blocks directed towards determining a maximum sequential compression amount of an L2P table.

In another embodiment, the method/process 1400 may include additional blocks directed towards determining available space within a RAM cache of the L2P table. In such embodiments, the method/process can further include periodically sending the L2P table information to a storage management device.

Figure 15:
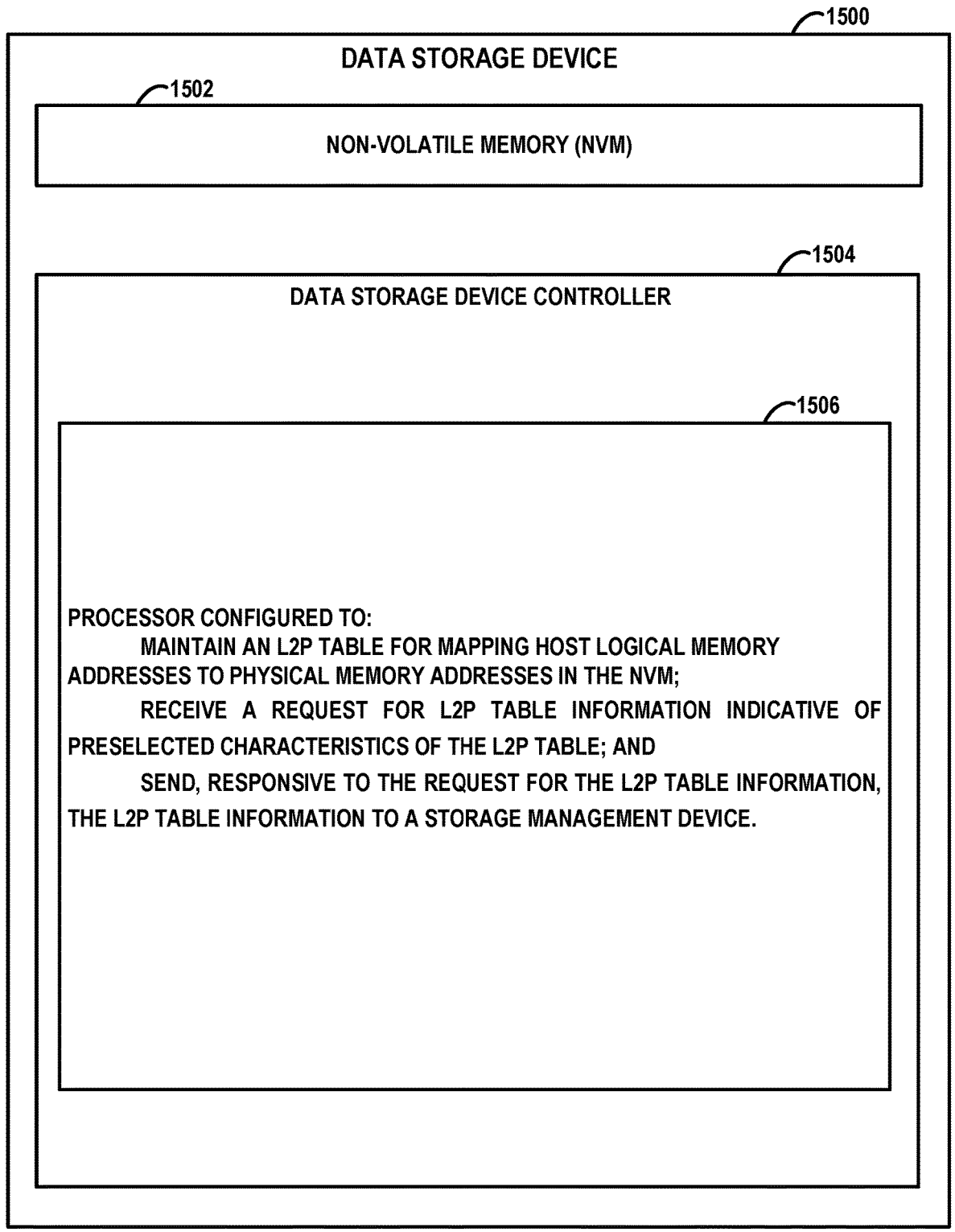
FIG. 15 is a schematic block diagram illustrating an exemplary DSD configured to perform L2P table management in accordance with some aspects of the disclosure.

FIG. 15 is a schematic block diagram illustrating an exemplary DSD 1500 configured to L2P table management in accordance with some aspects of the disclosure. The DSD 1500 includes an NVM 1502 and a DSD controller 1504. The DSD controller 1504 includes a processor or processing circuit 1506 configured to: maintain a logical to physical (L2P) table for mapping host logical memory addresses to physical memory addresses in the NVM, receive a request for L2P table information indicative of preselected characteristics of the L2P table, and send responsive to the request for the L2P table information, the L2P table information to a storage management device (e.g., storage management device 110 illustrated in FIG. 1, storage management device 310 at FIG. 3, storage management device 410 at FIG. 4 storage management device 600 illustrated in FIG. 6, storage management device 1100 illustrated in FIG. 11, or the combination of apparatus 1600 and NVM 1601 illustrated in FIG. 16)).

Various other aspects for DSD 1500 are also contemplated. For instance, in a particular embodiment, the processor 1506 may also be configured to determine a maximum sequential compression amount of an L2P table.

In another embodiment, the processor 1506 may also be configured to determine available space within a RAM cache of the L2P table. In such embodiments, the processor 1506 may also be configured to periodically send the L2P table information to a storage management device.

Figure 16:
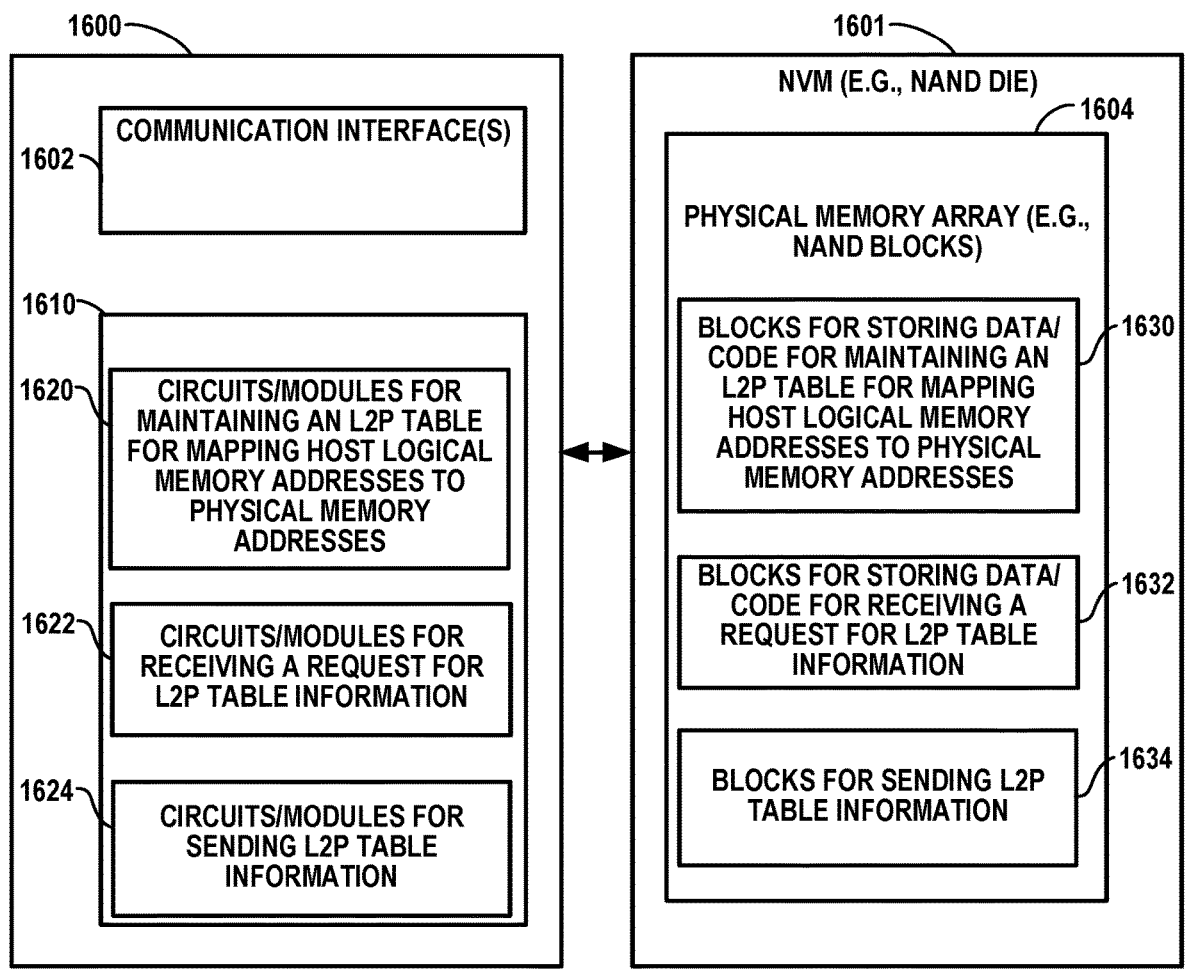
FIG. 16 is a schematic block diagram configuration for an exemplary DSD configured to perform L2P table management in accordance with some aspects of the disclosure.

FIG. 16 is a schematic block diagram configuration for an exemplary DSD 1600 configured to perform L2P table management in accordance with some aspects of the disclosure. The apparatus 1600, or components thereof, could embody or be implemented within a data storage controller such as a DSD controller coupled to a volatile memory (not shown) and a NAND die or some other type of NVM array that supports data storage. In various implementations, the apparatus 1600, or components thereof, could be a component of a processor, a controller, a computing device, a personal computer, a portable device, workstation, a server, a personal digital assistant, a digital camera, a digital phone, an entertainment device, a medical device, a self-driving vehicle control device, an edge device, or any other electronic device that stores, processes, or uses data.

The apparatus 1600 includes a communication interface 1602 and is coupled to a NVM 1601 (e.g., a NAND die). The NVM 1601 includes physical memory array 1604. These components can be coupled to and/or placed in electrical communication with one another via suitable components, represented generally by the connection line in FIG. 16. Although not shown, other circuits such as timing sources, peripherals, voltage regulators, and power management circuits may be provided, which will not be described any further. Additional components, such as those shown in FIG. 9, may also be included with apparatus 1600.

The communication interface 1602 of the apparatus 1600 provides a means for communicating with other apparatuses over a transmission medium. In some implementations, the communication interface 1602 includes circuitry and/or programming (e.g., a program) adapted to facilitate the communication of information bi-directionally with respect to one or more devices in a system. In some implementations, the communication interface 1602 may be configured for wire-based communication. For example, the communication interface 1602 could be a bus interface, a send/receive interface, or some other type of signal interface including circuitry for outputting and/or obtaining signals (e.g., outputting signal from and/or receiving signals into a DSD).

The physical memory array 1604 may include one or more NAND blocks 1640, or other suitable NVM blocks. The physical memory array 1604 may be accessed by the processing components 1610.

In one aspect, the apparatus 1600 may also include volatile memory for storing instructions and other information to support the operation of the processing components 1610.

The apparatus 1600 includes various processing components 1610 arranged or configured to obtain, process and/or send data, control data access and storage, issue or respond to commands, and control other desired operations. For example, the components 1610 may be implemented as one or more processors, one or more controllers, and/or other structures configured to perform functions. According to one or more aspects of the disclosure, the components 1610 may be adapted to perform any or all of the features, processes, functions, operations and/or routines described herein. For example, the components 1610 may be configured to perform any of the steps, functions, and/or processes described with respect to the FIGS. included herein. As used herein, the term "adapted" in relation to components 1610 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with the FIGS. included herein. The components 1610 serve as an example of a means for processing. In various implementations, the components 1610 may provide and/or incorporate, at least in part, functionality described above for the components of controller 1308 of FIG. 13 or DSD controller 1404 of FIG. 14.

According to at least one example of the apparatus 1600, the processing components 1610 may include one or more of: circuit/modules 1620 to maintain an L2P table for mapping host logical memory addresses to physical memory addresses in the NVM; circuit/modules 1622 for receiving a request for L2P table information indicative of preselected characteristics of the L2P table; and circuits/modules 1624 configured for sending, responsive to the request for the L2P table information, the L2P table information to a storage management device.

The physical memory array 1604 may include one or more of: blocks 1630 configured to store data/code for maintaining an L2P table for mapping host logical memory addresses to physical memory addresses in the NVM; blocks 1632 configured to store data/code for receiving a request for L2P table information; and blocks 1634 configured to store data/code for sending, responsive to the request for the L2P table information, the L2P table information to a storage management device.

In at least some examples, means may be provided for performing the functions illustrated in FIGS. 7-10 and/or other functions illustrated or described herein. For example, the means may include one or more of: means, such as circuit module 1620 to maintain an L2P table for mapping host logical memory addresses to physical memory addresses in the NVM; means, such as circuit/module 1622 for receiving a request for L2P table information indicative of preselected characteristics of the L2P table; and means, such as circuit/module 1624, for sending, responsive to the request for the L2P table information, the L2P table information to a storage management device. The means may include circuit/module 1624 for periodically sending L2P table information comprising a maximum sequential compression amount of an L2P table and an available space within a RAM cache of the L2P table.

In the examples of the figures included herein, NAND memory is sometimes set forth as an exemplary NVM. In one aspect, the NVM may be flash memory or another suitable NVM, examples of which are noted above at the beginning of the Detailed Description section.

ADDITIONAL ASPECTS

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a DSP, an ASIC, a FPGA or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented, or a method may be practiced using any number of the aspects set forth herein. In addition, such an apparatus may be implemented, or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, PLDs, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," "in one aspect," or similar language means that a particular feature, structure, or characteristic described in connection with the embodiment is included in at least one embodiment of the present disclosure. Thus, appearances of the phrases "in one embodiment," "in an embodiment," "in one aspect," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC). Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage system, comprising:
a plurality of data storage devices, each comprising a non-volatile memory (NVM); and
a storage management device configured to:
receive logical to physical (L2P) table information from at least two data storage devices of the plurality of data storage devices, wherein, for each of the at least two data storage devices, the L2P table information comprises an available space for a respective L2P table;
receive host data from a host device to be stored in one or more of the plurality of data storage devices;
select, based on the L2P table information from the at least two data storage devices and a size of the host data, a target data storage device from the plurality of data storage devices; and
send the host data to the target data storage device.

2. The data storage system of claim 1, wherein, for each of the at least two data storage devices, the L2P table information further comprises a maximum sequential compression amount for the respective L2P table.

3. The data storage system of claim 2, wherein the storage management device is further configured to select, based on the L2P table information from the at least two data storage devices, the target data storage device from the plurality of data storage devices by being further configured to:
select, based on the maximum sequential compression amount and the size of the host data, the target data storage device that will minimize a total number of new logical to physical (L2P) table entries required to write the host data to the target data storage device.

4. The data storage system of claim 3, wherein:
the available space for the respective L2P table comprises an available space within a random access memory (RAM) cache for the respective L2P table; and
the storage management device is further configured to select, based on the L2P table information from the at least two data storage devices, the target data storage device from the plurality of data storage devices by being further configured to:
select the target data storage device having sufficient available space in the L2P RAM cache of the target data storage device to store a number of L2P table entries required to write the host data to the target data storage device.

5. The data storage system of claim 1, wherein, for each of the at least two data storage devices, the L2P table information comprises the available space within a random access memory (RAM) cache for the respective L2P table.

6. The data storage system of claim 5, wherein the storage management device is further configured to select, based on the L2P table information from the at least two data storage devices, the target data storage device from the plurality of data storage devices by being further configured to:
select the target data storage device having sufficient available space in the L2P RAM cache of the target data storage device to store a number of L2P table entries required to write the host data to the target data storage device.

7. The data storage system of claim 1, wherein:
each of the at least two data storage devices comprises an L2P table having L2P table entries; and
the storage management device is further configured to select, based on the L2P table information from the at least two data storage devices, the target data storage device from the plurality of data storage devices by being further configured to:
select the target data storage device such that a total number of new L2P table entries required to store the host data in the target data storage device is minimized.

8. The data storage system of claim 1, wherein the storage management device is further configured to:
periodically receive L2P table information from the plurality of data storage devices.

9. The data storage system of claim 1, wherein each of the at least two data storage devices comprises a solid state drive (SSD).

10. The data storage system of claim 9, wherein the plurality of data storage devices further comprises a magnetic storage device.

11. The data storage system of claim 1, wherein the storage management device comprises a server.

12. A method for data storage, the method comprising:
receiving logical to physical (L2P) table information at a storage management device from at least two data storage devices of a plurality of data storage devices, the plurality of data storage devices each comprising a non-volatile memory (NVM), wherein, for each of the at least two data storage devices, the L2P table information comprises an available space for a respective L2P table;
receiving host data from a host device to be stored in one of the plurality of data storage devices;
selecting, based on the L2P table information, a target data storage device from the plurality of data storage devices; and
sending the host data to the target data storage device.

13. The method for data storage of claim 12, wherein, for each of the at least two data storage devices, the L2P table information further comprises a maximum sequential compression amount for the respective L2P table.

14. The method for data storage of claim 13, wherein selecting, based on the L2P table information, the target data storage device from the at least two data storage devices, further comprises:
selecting, based on the maximum sequential compression amount and a size of the host data, the target data storage device that will minimize a total number of new logical to physical (L2P) table entries required to write the host data to the target data storage device.

15. The method for data storage of claim 12, wherein the available space for the respective L2P table comprises an available space within a random access memory (RAM) cache for the respective L2P table.

16. The method for data storage of claim 15, wherein selecting, based on the L2P table information, the target data storage device from the plurality of data storage devices, further comprises:
selecting the target data storage device having sufficient available space in the L2P RAM cache of the target data storage device to store a required number of L2P table entries required to write the host data to the target data storage device.

17. The method for data storage of claim 15, wherein:
each of the at least two data storage devices comprises an L2P table having L2P table entries; and
selecting, based on the L2P table information, the target data storage device from the plurality of data storage devices, further comprises:

selecting the target data storage device such that a total number of new L2P table entries required to store the host data in the target data storage device is minimized.

18. A data storage system, comprising:
a plurality of data storage devices each comprising a non-volatile memory (NVM);
means for receiving logical to physical (L2P) table information at a storage management device from the plurality of data storage devices, wherein the L2P table information comprises an available space for a respective L2P table;
means for receiving host data from a host device to be stored in one of the plurality of data storage devices;
means for selecting, based on the L2P table information, a target data storage device from the plurality of data storage devices; and
means for sending the host data to the target data storage device.

19. A data storage device, comprising:
a non-volatile memory (NVM); and
one or more processors coupled to the NVM, the one or more processors, individually or in combination, configured to:
maintain a logical to physical (L2P) table for mapping host logical memory addresses to physical memory addresses in the NVM;
receive a request for L2P table information indicative of preselected characteristics of the L2P table; and
send, responsive to the request for the L2P table information, the L2P table information to a storage management device,
wherein the L2P table information comprises an available space for additional entries to the L2P table.

20. The data storage device of claim 19, further comprising:
a random access memory (RAM) cache for the L2P table; and
wherein:
the L2P table information further comprises a maximum sequential compression amount of the L2P table; and
the available space for the additional entries to the L2P table comprises an available space within the L2P table RAM cache.

* * * * *